US011157918B1

United States Patent
Ellison et al.

(10) Patent No.: US 11,157,918 B1
(45) Date of Patent: Oct. 26, 2021

(54) OFFICIAL VETTING USING MULTIPLE CONFIDENCE LEVELS BASED ON LINKED MOBILE IDENTIFICATION CREDENTIALS

(71) Applicant: The Government of the United States of America, as represented by the Secretary of Homeland Security, Washington, DC (US)

(72) Inventors: Chang Ellison, Arlington, VA (US); Kelli L. Biegger, McLean, VA (US); Daniel A. Boyd, Arlington, VA (US); Brandon P. Gutierrez, Burke, VA (US); Jason Lim, Alexandria, VA (US)

(73) Assignee: The Government of the United States of America, as represented by the Secretary of Homeland Security, Washington, DC (US)

( * ) Notice: Subject to any disclaimer, the term of this patent is extended or adjusted under 35 U.S.C. 154(b) by 0 days.

(21) Appl. No.: 17/169,187

(22) Filed: Feb. 5, 2021

Related U.S. Application Data

(60) Provisional application No. 63/050,490, filed on Jul. 10, 2020.

(51) Int. Cl.
*G06Q 30/00* (2012.01)
*H04W 12/06* (2021.01)
*H04L 9/32* (2006.01)

(52) U.S. Cl.
CPC ......... *G06Q 30/018* (2013.01); *H04L 9/3213* (2013.01); *H04W 12/06* (2013.01)

(58) Field of Classification Search
CPC .... G06Q 30/018; H04W 12/06; H04L 9/3213
(Continued)

(56) References Cited

U.S. PATENT DOCUMENTS 7,849,501 B2 * 12/2010 Vishik ............... H04L 9/321
                                                  726/10
8,353,016 B1 * 1/2013 Pravetz ............... G06F 21/36
                                                  726/5
(Continued)

OTHER PUBLICATIONS

IEEE Conferences | Aug. 1, 2020 | 2020 IEEE Intl Conf on Dependable, Autonomic and Secure Computing, Intl Conf on Pervasive Intelligence and Computing, Intl Conf on Cloud and Big Data Computing, Intl Conf on Cyber Science and Technology Congress (DASC/PiCom/CBDCom/CyberSciTech) (pp. 483-490) (Year: 2020).*

*Primary Examiner* — Sarah M Monfeldt
*Assistant Examiner* — Wenren Chen
(74) *Attorney, Agent, or Firm* — Lavanya Ratnam; Kelly G. Hyndman; Robert W. Busby

(57) ABSTRACT

In an example, a subject using a user mobile-identification-credential device (UMD) requests vetting by a vetting system, which receives verified part or all of subject information associated with a level-n mobile identification credential (MIC-n) that UMD received from a level-n authorizing party system (APS-n). The MIC-n is linked to lower level MIC-0 to MIC-(n−1). The vetting system, as level-n relying party system (RPS-n), uses the verified subject information associated with the linked MIC-0 to MIC-n to verify or not verify the identity of the subject, develops an identity profile of the subject, and determines a vetting result of the subject. MIC-i (i=1 to n) is linked to MIC-(i−1) which UMD received from APS-(i−1), and the APS-i is RPS-(i−1) which verified the identity of the subject using verified part or all of subject information associated with the MIC-(i−1), such that MIC-0 to MIC-n from level-0 to level-n are linked.

18 Claims, 20 Drawing Sheets

(58) Field of Classification Search
USPC .......................................................... 705/317
See application file for complete search history.

(56) References Cited

U.S. PATENT DOCUMENTS

| | | | |
|---|---|---|---|
| 9,147,117 B1 | 9/2015 | Madhu et al. | |
| 10,503,912 B1 | 12/2019 | Kerr | |
| 2007/0079136 A1 | 4/2007 | Vishik et al. | |
| 2012/0144461 A1* | 6/2012 | Rathbun | ............... H04L 9/3213 |
| | | | 726/5 |
| 2014/0020073 A1* | 1/2014 | Ronda | .................... G06F 21/44 |
| | | | 726/7 |
| 2014/0207537 A1 | 7/2014 | Joyce et al. | |
| 2016/0055322 A1 | 2/2016 | Thomas | |
| 2016/0078581 A1 | 3/2016 | Maher | |
| 2017/0032485 A1 | 2/2017 | Vemury | |
| 2017/0069151 A1* | 3/2017 | Saravanan | ................ G07C 9/27 |
| 2017/0094514 A1* | 3/2017 | Kelts | ..................... H04L 67/025 |
| 2018/0165655 A1 | 6/2018 | Marcelle et al. | |
| 2019/0036688 A1 | 1/2019 | Wasily et al. | |
| 2019/0043148 A1 | 2/2019 | Vemury | |
| 2019/0057412 A1 | 2/2019 | Bhattacharjee et al. | |
| 2019/0163876 A1 | 5/2019 | Remme et al. | |
| 2019/0164165 A1 | 5/2019 | Ithabathula | |
| 2019/0287111 A1 | 9/2019 | Cvetkovich et al. | |
| 2020/0168306 A1 | 5/2020 | Chen et al. | |

\* cited by examiner

OFFICIAL VETTING USING MULTIPLE CONFIDENCE LEVELS BASED ON LINKED MOBILE IDENTIFICATION CREDENTIALS

CROSS-REFERENCE TO RELATED APPLICATIONS

The application claims the benefit of priority from U.S. Provisional Patent Application No. 63/050,490, filed on Jul. 10, 2020, entitled OFFICIAL VETTING USING MULTIPLE CONFIDENCE LEVELS BASED ON LINKED MOBILE IDENTIFICATION CREDENTIALS, the disclosure of which is incorporated by reference in its entirety.

SUMMARY STATEMENT OF GOVERNMENT INTEREST

The present invention was made by employees of the United States Department of Homeland Security in the performance of their official duties. The U.S. Government has certain rights in this invention.

FIELD

The discussion below relates generally to systems and methods of vetting an individual and, more specifically, to a vetting process using multiple confidence levels based on linked mobile identification credentials.

BACKGROUND

A government vets a person before granting them access to protected information. Here, access generally means access to protected information, but also includes accreditation at a predetermined level such as a security clearance. More sensitive categories of protected information warrant more extensive vetting. Moreover, vetting is not limited to government vetting for security clearance purposes but encompasses other situations such as government background checks for employment or the like. The individual volunteers to be vetted by the government.

SUMMARY

Embodiments of the present disclosure are directed to apparatuses and methods for providing a robust and secure way for a vetting service or entity (e.g., government, prospective employer, or the like) to verify the identity of and develop an identity profile for a subject by leveraging a mobile identification credential (MIC) before granting the subject access to sensitive information or offering employment or membership to the subject. In this disclosure, "user" and "subject" are used interchangeably to refer to the MIC user as a patient in the medical records context.

In one embodiment, the subject makes a request to be vetted by a vetting service. The subject presents a subject device in the form of a user mobile-identity-credential device (UMD) that includes a mobile identification credential (MIC) such as a mobile driver's license (mDL) as part of an environment that supports MICs. In such an environment, the MIC is issued by an authorizing party, such as a state department of motor vehicles (DMV) or some other issuing authority, using an authorizing party system (APS). The UMD interacts with another device to share some or all of the content of the MIC. The device that is to receive the MIC information may be held by the vetting service, which is a relying party that will rely on the information yielded via the MIC. The device of the relying party is referred to as a Relying Party System (RPS). Upon verifying the identity of the subject, the vetting of the subject is performed. In another embodiment, the request may be made from a remote location via a network. In that case, an additional liveness check may be optionally used to ensure the request is made by the subject matching the MIC.

The UMD, having obtained a level-n mobile identification credential (MIC-n) from a level-n authorizing party system (APS-n), requests vetting of the subject from the vetting service having the level-n relying party system (RPS-n). The MIC-n is linked to lower level mobile identification credentials from MIC-0 to MIC-(n−1). MIC-i (i=1 to n) is linked to MIC-(i−1) which the subject device received from APS-(i−1), and the APS-i is RPS-(i−1) which verified the identity of the subject using verified part or all of subject information associated with the MIC-(i−1), such that MIC-0 to MIC-n from level-0 to level-n are linked. The subject/user ID information associated with the MIC-n includes the subject information associated with MIC-0 to MIC-(n−1) by virtue of the linked status of MIC-0 to MIC-n.

To verify the identity of the user/subject, the RPS-n requests subject/user ID information from the UMD in response to the request for vetting. The user gives consent to release some or all of the user ID information associated with the MIC-n. The RPS-n receives the released user ID information which is verified as being trusted user ID information. Next, the vetting system, as a level-n relying party system (RPS-n), uses the trusted user ID information, which is received from the UMD or the APS-n, to verify the identity of the user who requests the vetting using the UMD. When the identity of the user from the UMD is verified to the satisfaction of the RPS-n, the RPS-n develops an identity profile of the user using the verified user ID information associated with linked MIC-0 to MIC-n. The RPS-n determines a vetting result of the user based on the identity profile.

The UMD, as directed by the user/subject, specifies to the vetting system RPS-n which of the user's linked MIC information (MIC-0 to MIC-n) is authorized for release. The vetting system RPS-n collects or compiles the released linked MIC-i information and obtains or assigns a MIC trust value for each MIC-i based on the category of content of the MIC information. The RPS-n compares the composite trust score with a preset threshold, which can be set by the vetting service or some other authorities or entities. When the composite trust score is at or above the preset threshold, the user passes the vetting. When the composite trust score is below the preset threshold, the user fails the vetting. Passing the vetting may mean that, upon evaluating the subject's profile for any one or more of possible security, financial, ethics, and moral concerns, the subject is found to be trustworthy with a sufficiently high composite trust score.

In specific embodiments, the linked MICs are weighted by confidence coefficients of corresponding APSs and/or confidence coefficients of the collection methods used to obtain the information.

In accordance with as aspect of the present disclosure, a method for vetting an individual as a subject to be vetted, the method comprises: receiving, by a vetting system of a vetting service, a vetting request from a subject device of the subject; sending, by the vetting system to the subject device, a request for identification information of the subject; receiving, by the vetting system, part or all of subject information associated with a level-n mobile identification credential (MIC-n) which the subject device received from a level-n authorizing party system (APS-n), the subject having consented to release the part or all of subject information to the vetting system, the part or all of subject information having been verified, the MIC-n being linked to lower level mobile identification credentials from MIC-0 to MIC-(n−1); using, by the vetting system as a level-n relying party system (RPS-n), the verified part or all of subject information associated with the linked MIC-0 to MIC-n to verify or not verify the identity of the subject; developing an identity profile of the subject, by the vetting system, based on verifying or not verifying the identity of the subject using the verified part or all of subject information associated with the linked MIC-0 to MIC-n; and determining a vetting result of the subject, by the vetting system, based on the identity profile. MIC-i (i=1 to n) is linked to MIC-(i−1) which the subject device received from APS-(i−1), and the APS-i is RPS-(i−1) which verified the identity of the subject using verified part or all of subject information associated with the MIC-(i−1), with MIC-0 to MIC-n from level-0 to level-n being linked. The subject information associated with the MIC-n includes the subject information associated with MIC-0 to MIC-(n−1) by virtue of a linked status of MIC-0 to MIC-n.

Another aspect of the disclosure is directed to a vetting system for a vetting service to vet an individual as a subject to be vetted. The vetting system comprises a computer programmed to: receive a vetting request from a subject device of the subject; send, to the subject device, a request for identification information of the subject; receive part or all of subject information associated with a level-n mobile identification credential (MIC-n) which the subject device received from a level-n authorizing party system (APS-n), the subject having consented to release the part or all of subject information to the vetting system, the part or all of subject information having been verified, the MIC-n being linked to lower level mobile identification credentials from MIC-0 to MIC-(n−1); use, by the vetting system as a level-n relying party system (RPS-n), the verified part or all of subject information associated with the linked MIC-0 to MIC-n to verify or not verify the identity of the subject; develop an identity profile of the subject based on verifying or not verifying the identity of the subject using the verified part or all of subject information associated with the linked MIC-0 to MIC-n; and determine a vetting result of the subject based on the identity profile. MIC-i (i=1 to n) is linked to MIC-(i−1) which the subject device received from APS-(i−1), and the APS-i is RPS-(i−1) which verified the identity of the subject using verified part or all of subject information associated with the MIC-(i−1), with MIC-0 to MIC-n from level-0 to level-n being linked. The subject information associated with the MIC-n includes the subject information associated with MIC-0 to MIC-(n−1) by virtue of a linked status of MIC-0 to MIC-n.

Another aspect of this disclosure is directed to a system, comprising a subject device and a vetting system of a vetting service, for a subject using the subject device to submit a vetting request to the vetting system of the vetting service, the vetting system including a vetting service computer programmed to perform operations according to vetting service instructions, the subject device including a subject computer programmed to perform operations according to subject instructions, the subject device having received a level-n mobile identification credential (MIC-n) from a level-n authorizing party system (APS-n), the APS-n including an APS-n computer programmed to perform operations according to APS-n instructions, the MIC-n being linked to lower level mobile identification credentials from MIC-0 to MIC-(n−1). The subject device sends, to the vetting system, a vetting request to vet the subject. The vetting system sends, to the subject device, a request for identification information of the subject. The subject device receives, from the subject, consent to release part or all of subject information associated with the MIC-n. Either (i) the subject device sends, to the vetting system, the consented part or all of subject information, and the APS-n verifies the part or all of subject information associated with the MIC-n or (ii) the APS-n sends, to the vetting system, the consented part or all of subject information as verified part or all of subject information associated with the MIC-n. The vetting system, as a level-n relying party system (RPS-n) uses the verified part or all of subject information associated with the MIC-n to verify or not verify the identity of the subject. The vetting system develops an identity profile of the subject based on verifying or not verifying the identity of the subject using the verified part or all of subject information associated with the linked MIC-0 to MIC-n. The vetting system determines a vetting result of the subject based on the identity profile. MIC-i (i=1 to n) is linked to MIC-(i−1) which the subject device received from APS-(i−1), and the APS-i is RPS-(i−1) which verified the identity of the subject using verified part or all of subject information associated with the MIC-(i−1), with MIC-0 to MIC-n from level-0 to level-n being linked. The subject information associated with the MIC-n includes the subject information associated with MIC-0 to MIC-(n−1) by virtue of a linked status of MIC-0 to MIC-n.

Other features and aspects of various embodiments will become apparent to those of ordinary skill in the art from the following detailed description which discloses, in conjunction with the accompanying drawings, examples that explain features in accordance with embodiments. This summary is not intended to identify key or essential features, nor is it intended to limit the scope of the invention, which is defined solely by the claims.

BRIEF DESCRIPTION OF THE DRAWINGS

The attached drawings help explain the embodiments described below.

DETAILED DESCRIPTION

Figure 1:
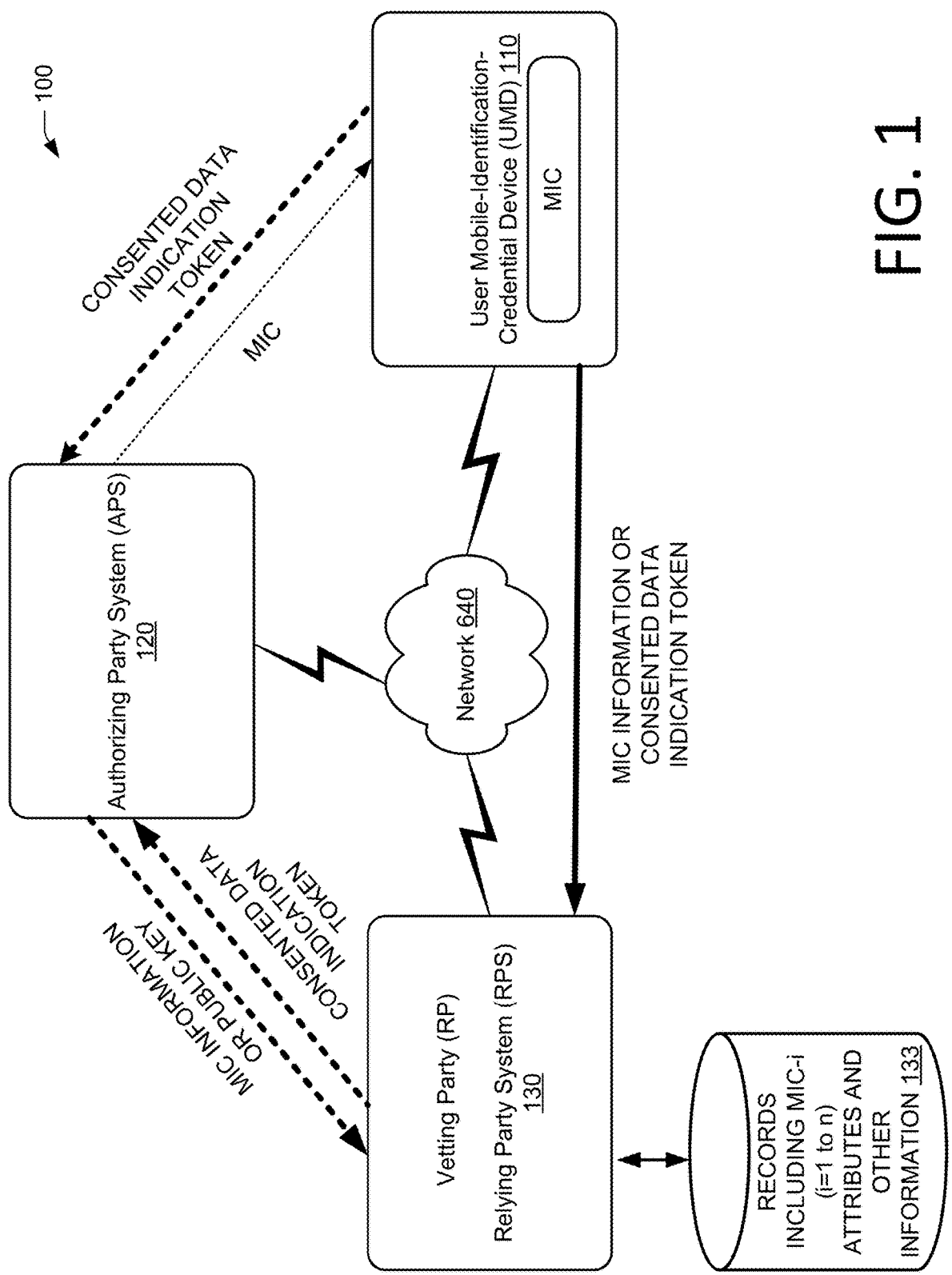
FIG. 1 shows an example of an overall system employing mobile identification credentials in processing a vetting request.

This detailed description, like the drawings, omits various details to help focus the reader's attention to the key points.
System Embodiments FIG. 1 shows an example of an overall system 100 employing mobile identification credentials to verify information of a subject requesting to be vetted, which includes verifying the identity of and developing an identity profile for the subject. Vetting may include identifying any concerns in the identity profile, such as one or more of security, financial, ethics, and moral concerns, and determining whether the subject passes or fails based on such concerns.

In an environment that supports its use, a Mobile Identification Credential (MIC) can enable a user to conveniently prove the user's identity. One embodiment of a MIC is a mobile driver's license (mDL) issued by an official agency such as a state Department of Motor Vehicles (DMV). Another embodiment of a MIC is a mobile passport. A mobile passport may, for example, be issued by the U.S. Department of State or a foreign ministry of another nation. The MIC can include various information, such as information relating to identity or privileges pertaining to the user.

The MIC itself may be portable and can be provisioned to devices. Below, the device to which the MIC is provisioned is referred to hereinafter as a User Mobile-Identification-Credential Device (UMD) 110. The term UMD pertains to any device to which a MIC can be provisioned including, without limitation, smart watches, smart fitness bands, smart objects, smart phones, e-readers, tablet computers, smart televisions and displays, smart cameras, laptop computers, desktop computers, servers, kiosks, chips, flash drives, and USB drives.

In an embodiment, the issuer of the MIC (the MIC Issuer) may provision and issue the valid, authentic MIC to the UMD. The MIC issuer may work with a MIC provider to facilitate the provisioning of the MIC to the UMD. The MIC Issuer also may work with a third party to provision the MIC to the UMD. In another embodiment, the user may provision the MIC from one device of the user to another device of the user (e.g., from the desktop computer to the smart fitness band).

A MIC may be validated by an Authorizing Party (AP). In one embodiment, the AP may be an official agency such as a state DMV. In another embodiment, the AP may be a third party empowered by an official agency to perform such verification operations. The AP employs an Authorizing Party System (APS) 120. The APS may provision the MIC to the UMD.

MIC Transactions

MIC transactions can be online or offline. Generally, the UMD 110 may interact or transact with other devices to share some or all of the content of the MIC. The device through which the UMD 110 shares the MIC user information is referred to as a Relying Party System (RPS) 130. The RPS is a system operated by or for a Relying Party (RP). The RPS may obtain MIC user information according to an online mode or an offline mode, based on the RPS's being able to trust the MIC user information and perform verification of the MIC user information, as enabled by the environment in which the MIC is used. In an online mode embodiment, the RPS 130 interacts with the APS 120 to verify the released MIC user information. In an offline mode, the RPS 130 may use a public key from the APS 120 to verify the released MIC user information. Generally, data transfers may be digitally signed, via electronic certificates, to verify authenticity of the data transferred. In addition to or instead of the use of digital signatures, data transfers may be encrypted via public-key cryptography to ensure integrity of the data transfers. Furthermore, data transfers can utilize tokenization to safeguard the online data transfers. Other embodiments rely on combinations of multiple such data protection procedures, as well as other data security best practices.

In some embodiments, secure local or remote connections may be established by using session keys, e.g., based on establishing session-specific encryption protocols. A session key is an encryption and decryption key that is randomly generated to ensure the security of a communications session between parties. A session key can be symmetric, used for encryption and decryption. A session key can be public or private. A session key can be ephemeral. As an example, usage of ephemeral public and private keys is described as follows. At initial engagement, a first device (Device 1) will pass its session public key to a second device (Device 2). Device 2 will use its private key and Device 1's public key to generate Device 2's public key. Device 2's public key is shared with Device 1. These ephemeral key pairs are used to encrypt and to decrypt messages sent between Device 1 and Device 2. A session begins when the two devices acknowledge each other and open a virtual connection, and ends when the two devices have obtained the information they need from one other and send "finished" messages, terminating the connection. Embodiments may make use of such session keys or other practices for establishing secure local or remote connections.

Online MIC Transactions

Online MIC transactions can involve trust and verification. An online MIC transaction may involve a UMD transferring MIC user information in response to a request from an RPS. The RPS verifies whether the received MIC user information is valid based on an online connection between the RPS and the APS. In an embodiment, the RPS may access an electronic certificate from the APS to verify the authenticity of the MIC user information received from the UMD. The UMD digitally signs the MIC user information using the electronic certificate from the APS. The UMD can retrieve the electronic certificate at the time of the transaction, either from the APS or from a certificate repository. In other embodiments, when something other than a public key is used to verify the MIC user information, the RPS may submit an electronic document or a digital file or the like to the APS in exchange for a key that may be referred to as an authentication key that is not public. The authentication key may be a public key that refreshes after a very short time, such that the RPS needs to reach out to the APS when it is time to verify the information and uses the public key with a short lifespan before it expires. In other embodiments, cryptography may be based on public/private key pairs.

The RPS or the UMD may perform a liveness check, e.g., by comparing collected biometric information to verified credentials. In an embodiment, an RPS may include a biometric sensor to capture biometric information of the user presenting at the RPS, such as a photograph, a video, a retina scan, a fingerprint, and the like. In another embodiment, the RPS may be configured to request a liveness check from the UMD. Due to the nature of the secure local connection as established through the handshake, the trustworthiness of information from the UMD responsive to the request is preserved. Accordingly, in an embodiment, the UMD may collect and transfer information that the RPS uses to perform the liveness check. For example, the UMD may collect a photograph, fingerprint, and accelerometer information that the RPS uses to determine whether the user's hand motions and/or walking gait are consistent with liveness check information known for the user. In another embodiment, the RPS determines that the UMD is deemed trustworthy for performing its own liveness check, and such UMD liveness determination performed by the UMD is accepted by the RPS. For example, the UMD may be a smartphone performing a facial recognition verification of the user, whose valid result the RPS accepts as verification that the proper user is legitimately in possession of the UMD and presenting the UMD at the RPS.

The interaction between the UMD and the RPS may be in-person, where a user is physically located at the RPS to present the UMD to the RPS. The interaction may be attended, where an attendant or other agent attending the RPS witnesses the transaction, to physically compare the appearance of the user, presenting the UMD at the RPS, against the MIC user information contained on the presented UMD. The interaction between the UMD and the RPS also may be remote, where a user is not physically located at or otherwise physically attending the interaction with RPS. For example, the user may be performing an online transaction using the UMD at home, which remotely transmits MIC user information over a remote connection from the UMD to the RPS located remote from the UMD, e.g., at an online web host.

Online MIC Transactions—Trust

The RPS needs to know, or trust, that the MIC user information obtained from the UMD is unchanged and matches official records. Part of this trustworthiness may be based on how the MIC was securely provisioned or placed onto the UMD, e.g., according to International Organization for Standardization (ISO) standards. Such secure provisioning enables the RPS to trust the MIC and its MIC user information, and also perform verification that such information matches official records pertaining to the person represented in the MIC user information. Trust also may be based on the reputation of the MIC issuer or the APS that provisioned the MIC onto the UMD. Trust further may be based on the trustworthiness of the connection between the RPS and the APS, e.g., based on a connection that is secured by encryption or other technological protections. In an embodiment, trust may be also based on the RPS reputation or other information about the RPS, such as Global Positioning System (GPS) coordinates, as detected by the UMD at the location of the transaction between the UMD and the RPS, matching known coordinates for that RPS.

Tokens can be used to establish trust, by exchanging tokens between the UMD, RPS, and APS. In an embodiment, a token or file may not actually contain requested MIC user information. Rather, the token or file may include a consented data indication to indicate which of the user's MIC user information is authorized for release. The APS can exchange the token or file for the MIC user information that is consented to be released by the APS to the RPS. When a user releases MIC user information from the UMD, the UMD passes an RPS token to the RPS, and passes an APS token to the APS. The RPS may communicate via an online connection with the APS, which compares the APS token received from the UMD to the RPS token received from the RPS. Upon verifying a match, the APS provides a copy of the MIC user information to the RPS. Thus, the matching of tokens over an online connection enables the APS to trust the transaction and release the requested information, via an online connection, to the RPS. Tokens similarly enable the UMD or RPS to trust the transaction. In another embodiment, the UMD sends an RPS token to the RPS and sends an APS token to the APS; then, the APS releases the MIC user information only if both the RPS token and the APS token are received and only if within a given timeframe.

Online MIC Transactions—Verification

The RPS can verify that the MIC user information is trustworthy. The MIC, as provisioned onto the UMD including the MIC user information, may be electronically signed in an embodiment, to enable the RPS to verify that the MIC is provisioned to the proper UMD belonging to the proper user. Embodiments may use other or multiple data protection procedures, as well as other data security best practices to verify information, connections, transaction participants, or the like. In the online context, the RPS has an online connection to the APS. The online connection enables the RPS to request and receive information or verification directly from the APS. Accordingly, the RPS can perform online verification of MIC user information received locally from the UMD, by comparing the local information against information at the APS. The RPS also can perform a local verification of MIC user information received remotely from the APS, e.g., using data protection or verification procedures, or other data verification best practices.

Offline MIC Transactions

Trust and verification also play a role in offline, or disconnected, MIC transactions. The offline context refers to a condition when one or all parties in a transaction do not have an online connection to each other or to the Internet. For example, the RPS may be in an isolated location, or may be suffering from a communications failure, and therefore lack an online connection for communicating with the APS. Transactions may still proceed, by virtue of the ability of the RPS and UMD to establish a local connection with each other based on trust and verification. An offline MIC transaction may involve the RPS's verifying whether the received MIC user information is valid, without the RPS's having an online connection, e.g., without communicating to an external system such as the APS that can verify whether MIC user information received by the RPS is trustworthy. In an embodiment, the RPS verifies a cryptographic signature on the individual data elements of the MIC user information using, e.g., signer certificates. This ensures the data is genuine and unchanged, based on the RPS's performing a local verification based on cryptographic operations. In another embodiment, the RPS accesses a copy of an electronic certificate stored locally at the UMD, and periodically refreshes locally stored electronic certificates independently of a given transaction. In some instances, the RPS does not have to submit anything to the APS to obtain a public key for that APS, because the RPS keeps a locally stored copy of that APS key. In an embodiment, the RPS periodically checks with the APS to refresh the locally stored public keys. In some cases, there may be a public key distributor (PKD). The distributor would be an agent acting on behalf of several trusted entities. This agent would hold the most up-to-date public keys and distribute to trusted relying parties such as the RPS. Offline MIC transactions may be in-person, attended, or remote, as explained above in the context of online MIC transactions.

Offline MIC Transactions—Trust

Similar to the online context, the RPS can establish trustworthiness in a MIC and MIC user information for offline MIC transactions. As explained above, the RPS can verify that the MIC was securely provisioned or placed onto the UMD, and therefore trust the MIC and its MIC user information, based on cryptographic operations. Trust also may be based on reputations of systems that provisioned the MIC onto the UMD, and the trustworthiness of connections or the technological protections used between systems involved in transactions.

Offline MIC Transactions—Verification

The RPS can perform a local, offline verification that the MIC user information is trustworthy, without an online connection. For example, the RPS may perform local cryptographic operations to confirm electronic signatures of the MIC and MIC user information obtained from the UMD. In an embodiment, the RPS may use digital signatures or encryption to obtain, locally, verification of MIC user information. Such verification is possible when the RPS receives the MIC user information directly from the UMD instead of the APS, e.g., when the RPS is operating in an offline mode. Thus, the RPS does not contact the APS, but instead uses an offline stored public key of the APS to verify that the MIC user information is trustworthy as received from the UMD.

In the MIC environment presented in FIG. 1, a person presents a UMD 110 that includes MIC as part of an environment that supports MICs. The APS 120 electronically provisions the valid, authentic MIC onto the UMD 110, to ensure confidentiality, integrity, and authenticity of the MIC, or may have a third party facilitate provisioning of the MIC to the UMD 110. The MIC may be associated with MIC information including biographics, biometrics, and other (such as privileges). The MIC may have a compartmentalized structure to enable the user to selectively control and release the information to relying parties. The provisioning of the MIC is done before the request for vetting and is thus indicated by a more lightly weighted arrow in FIG. 1.

Embodiments of the MIC environment may be compatible with multiple, different forms of identification (ID) and corresponding authorizing parties. The MIC may be capable of storing multiple different forms of ID simultaneously. For example, the MIC environment supports non-governmental forms of ID, including those from private companies, such as digital identification providers, third-party travel support providers, and the like. Embodiments may be compatible with forms of ID and their providers that are authorized by a governmental authority (or a non-governmental authority agreed upon by the relevant parties to the transaction) to provide and/or authorize credentials. For example, embodiments may be compatible with forms of employee IDs or other membership IDs such as real estate licenses, used to prove employment or other membership status (e.g., by including a verifiable employee ID number or other membership ID number).

Figure 3:
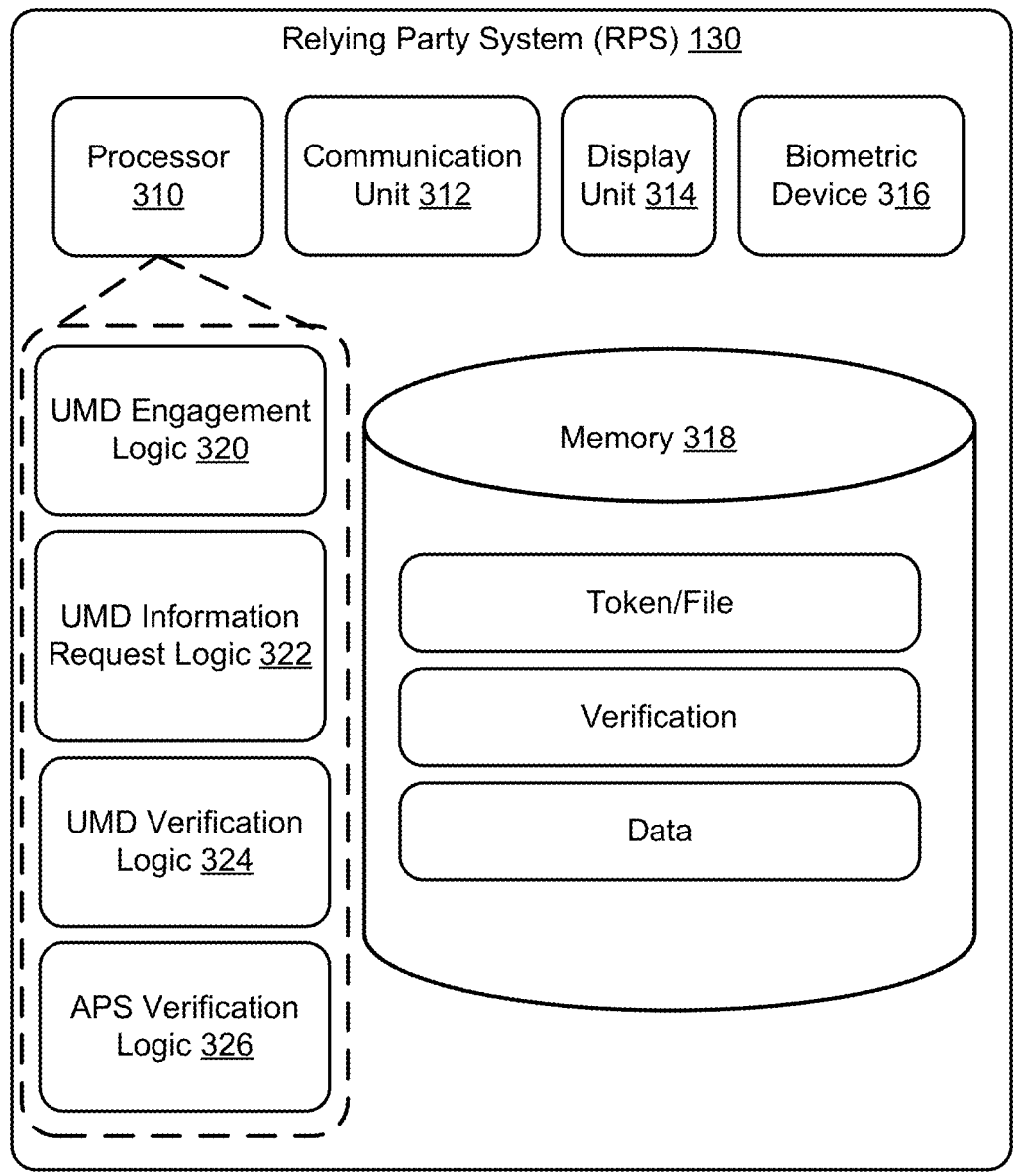
FIG. 3 illustrates a relying party system (RPS) according to an embodiment.
Figure 4:
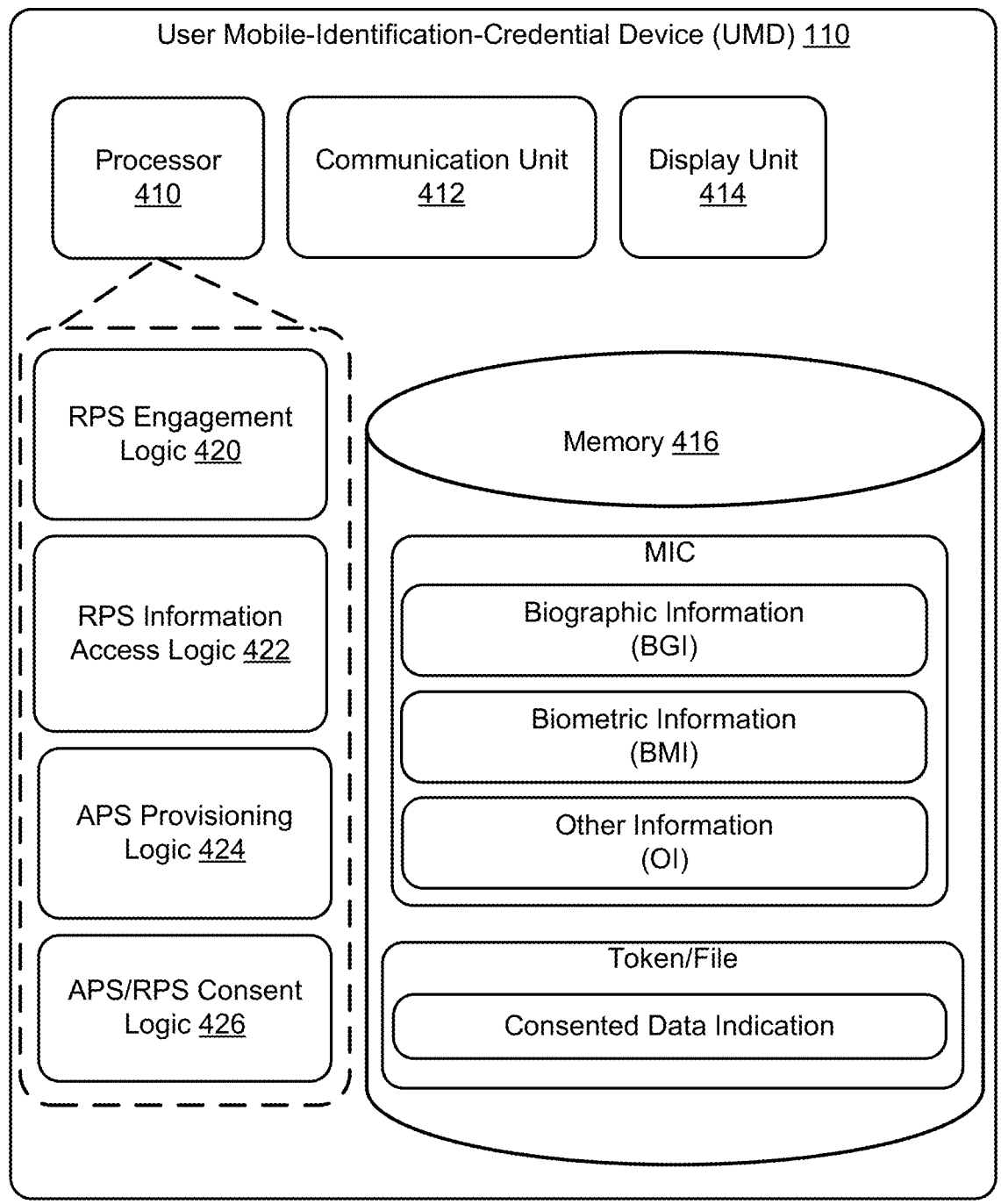
FIG. 4 illustrates a user mobile-identification-credential device (UMD) according to an example embodiment.

As seen in FIG. 1, the UMD 110 interacts with another device to share some or all of the content of the MIC. The device that is to receive the MIC information is held by the vetting service or some other vetting agency or investigative entity, which is a relying party that will rely on the information yielded via the MIC. The device of the relying party is the RPS 130. In some embodiments, the relying party has a database 133 of records including MIC-i (i can take on integer values from 1 to n) attributes and other information; such other information may include biographic information (e.g., age, gender, address, social security number, driver's license number, etc.) and/or biometric information (e.g., photograph, fingerprint, iris or retina scan, etc.). Such information can be used to conduct user verification independent of the use of the MIC information. The network 640 facilitates communication between the UMD 110, APS 120, and RPS 130. Examples of the network 640 may include the Internet and a variety of different wired and wireless networks. Examples of the APS 120, RPS 130, and UMD 110 are illustrated in FIGS. 2-4.

Figure 2:
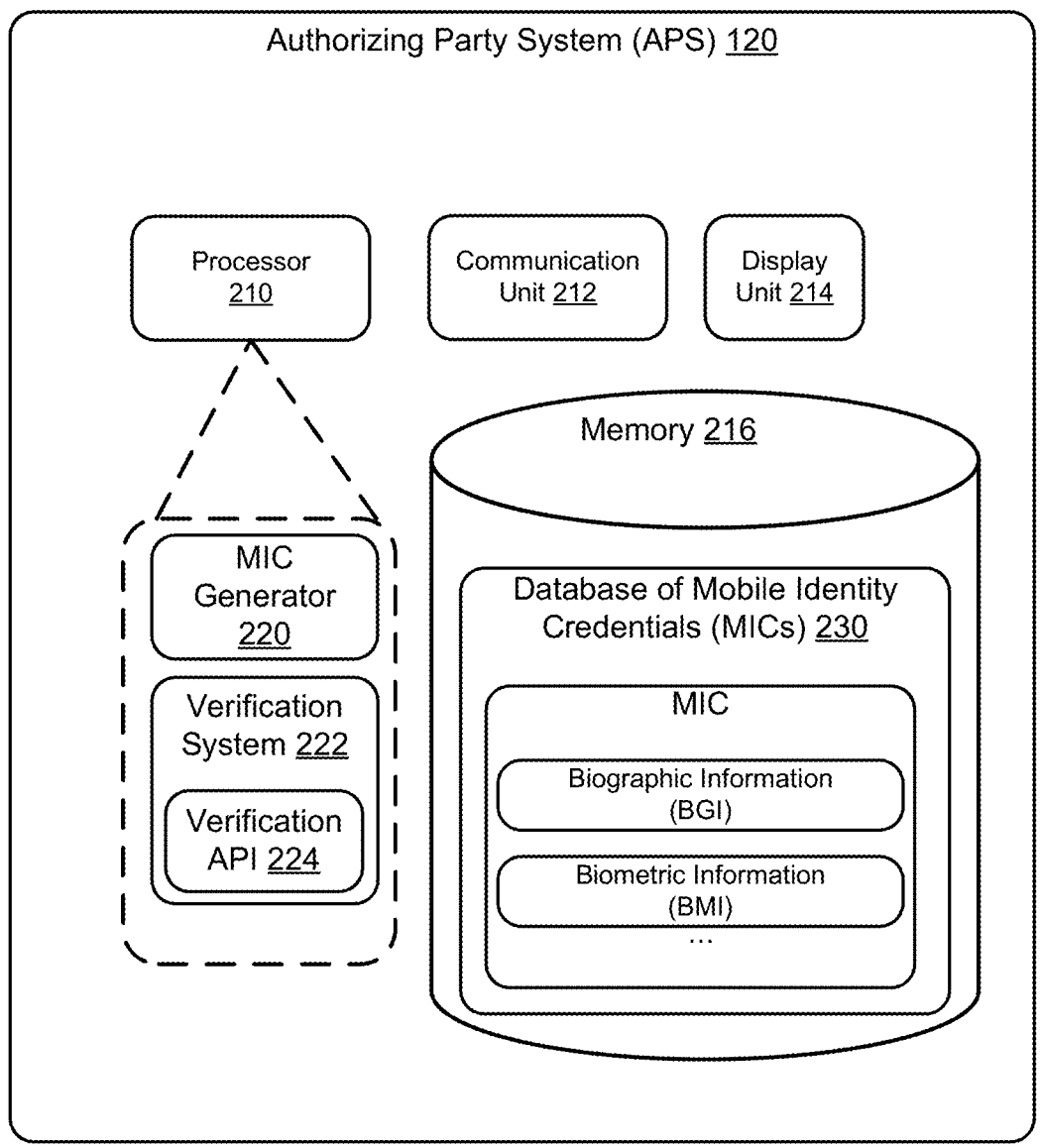
FIG. 2 illustrates an authorized party system (APS) according to an embodiment.

FIG. 2 illustrates an APS 120 according to an embodiment. The APS 120 includes a processor 210, a communication unit 212, a display unit 214, and a memory 216. The processor may be associated with logic or modules to process information, including a MIC generator 220 and a verification system 222 with a verification application programming interface (API) 224.

The MIC generator 220 enables the APS to generate a MIC for a given user. For example, the MIC generator receives unique information about the user, such as a social security number. The APS can reside in a local DMV office staffed with agents to verify physical documents in person, who traditionally verify that the social security number belongs to that user. The MIC generator creates a framework to build the MIC for the user and populates the MIC with corresponding biographic and biometric information, e.g., as available locally at the DMV office. In some embodiments, the MIC generator 220 may populate the MIC with other information corresponding to the user, such as driving privileges or special access. For example, the MIC can be issued or provisioned by the Federal Government, and may include special access, privileges, or MIC user information corresponding to positions at Federal Government agencies. In an example, the APS may be located at the DMV, and an agent of the DMV collects and manually verifies proof of identity that the user provides to the agent in person. In an embodiment, a kiosk at the DMV may perform a liveness check of the user and/or otherwise performs unattended verification of the proof of identity that the user provides to the kiosk.

In another embodiment, the MIC generator 220 facilitates verification of the user's identity attributes against official records available to the DMV and/or physically presented by the user. Facilitated verification can be attended by an agent in person, or unattended and self-performed by the user at a kiosk or other automated system. In an embodiment, such facilitated verification may involve the use of a system such as a kiosk or electronic device with audio/video playback and recording, visual scanning, or other telepresence capabilities, which the user accesses to interact remotely with an agent from the DMV or other APS that is to provision the MIC. Such a system can be located remote from the DMV or other APS facility, at which the agent is located, and can be separate from the UMD. In an embodiment, the system to interact with the agent may be the UMD that is to receive the MIC. Such system allows an agent at the DMV, through telepresence or other audio/visual interfaces of the system, to visually access, inspect, and verify information submitted as proof of identity (e.g., by scanning or photographing a birth certificate or the like). In another embodiment, such facilitated verification may involve the user's accessing a remote kiosk or smartphone app to virtually interact with an agent that facilitates the identity verification, or to interact with a self-guided verification user interface, such as a website or smartphone app.

Generated MICs may be stored in the memory of the APS and available for provisioning onto the UMD of the user. In an embodiment, a given APS provisions multiple different MICs onto the UMD, e.g., at an APS that provides a mDL and some other ID or proof. Examples include proof of residency and/or citizenship in cases where residency and/or citizenship are components of the vetting process.

Different types of MICs may be associated with corresponding different levels of assurance (such as multi-factor verification) needed to facilitate verification of the user's identity, whether in-person or remote, attended or unattended, or other aspects of the identity verification. Furthermore, in some embodiments, a given MIC environment may be associated with a corresponding trust framework, such as the transactions field (or the medical or healthcare field or the voting field) and a related set of rules pertinent to maintaining security of the transactions information (or the medical or healthcare information or the voting information). The level of assurance for a given MIC environment corresponds to the trust framework. Additionally, in an embodiment, communications with the MIC generator (and other aspects of the MIC environment including the APS, UMD, and RPS and their various modules or logic) may be facilitated and secured by cryptographic modules, e.g., as outlined in the National Institute of Standards and Technology (NIST) requirements and standards for cryptographic modules, the Federal Information Processing Standard (FIPS) publication 201 regarding Personal Identity Verification (PIV) requirements, and the like.

The verification system 222 of the APS 120 may be configured to interact with an RPS, such as when handling requests for user information received from an RPS. In the illustrated embodiment, the verification system uses a verification API to handle interactions in a standardized computing format.

The verification system 222 of the APS 120 also may be configured to interact with other systems, such as UMDs (to send or receive tokens), back ends, and the like. In an embodiment, the verification system may be configured to receive a token from the UMD, and a token from the RPS. The verification system then compares the tokens to determine whether the tokens match within an acceptable timeframe. In an embodiment, matching or otherwise verifying the two tokens indicates that the RPS is trustworthy regarding UMD consent and user information.

Generally, the APS verification system 222 verifies various aspects relating to MIC information. For example, the APS verification system may verify whether a request to release user MIC information is legitimate, and if so, authorize the release of such information. In an embodiment, the APS verification system authorizes release of MIC user information to the requesting RPS. In another embodiment, the APS verification system releases MIC user information to the UMD 110, e.g., when provisioning the MIC onto the UMD. In the illustrated example, the verification system uses a verification application programming interface (API) 224 to communicate with other systems requesting verification and/or MIC information, including RPSs and/or UMDs. In some embodiments, the verification system 222 of the APS 120 may be configured to communicate with other systems, such as other APSs including government entities, trusted certificate holders, open ID providers, back ends, and the like. The APS verification system enables such communications to be secure, ensuring the integrity of such communications.

The memory 216 may be associated with a database of MICs 230. A given MIC may include Biographic Information (BGI) and Biometric Information (BMI), which can be selectively requested and provided, e.g., as MIC user information, when the MIC is provisioned onto a UMD. The MIC also can include other information, such as privileges pertaining to the user.

The MIC generally may be structured to securely and discretely store various fields comprising the BGI, BMI, or other information. For example, the BGI may include first name, last name, date of birth, gender, address, identifier number, organ donor status, and the like. In an example, the BMI may include a digital photograph, a digital image representing a QR code containing the BGI, a digital fingerprint representation, a digital retina representation, and the like.

The structure of the MIC enables the other information to be added, such as when provisioning the MIC from the APS to a UMD, or after provisioning the MIC to the UMD, such as when the user enters information into the MIC via the UMD. For example, a user enters supplemental information into the MIC via the UMD, e.g., emergency contact information. Information on the MIC may be compartmentalized and separately accessible.

FIG. 3 illustrates a Relying Party System (RPS) 130 according to an embodiment. The RPS 130 includes a processor 310, a communication unit 312, a display unit 314, a biometric device 316, and a memory 318. The processor may be associated with logic or modules to process information, including UMD engagement logic 320, UMD information request logic 322, UMD verification logic 324, and APS verification logic 326. Embodiments of the RPS may include hardware (biometric device 316) to collect information to perform a liveness check of the user who is present at the location of the RPS, such as a camera, fingerprint reader, retina reader, and the like.

The biometric device 316 may include one or more biometric readers for obtaining biometric information from the user in person at the RPS 130, to be used to match authenticated biometric information in the MIC or otherwise stored in the APS 120 or the RPS 130. Examples include a fingerprint reader for fingerprint matching or recognition, a retina scanner for retina matching or recognition, a facial imaging device or camera for facial matching or recognition, and a voice recording device for voice matching or recognition.

The UMD engagement logic 320 may be configured to enable the RPS to establish a secure local connection with the user's UMD. For example, the UMD engagement logic establishes a key exchange protocol usable by the UMD, via radio frequency or visual communications. In an example, the UMD engagement logic encodes a public key in a QR code and displays the QR code to the UMD. Upon reading the QR code, the UMD responds to the RPS with a key exchange to secure a local connection between the RPS and the UMD. In some embodiments, the secure local connection utilizes protocols such as secure near-field, secure Bluetooth, secure Wi-Fi, or the like.

The RPS's UMD information request logic 322 may be configured to enable the RPS to structure a request for consent from the UMD and transmit that request to the UMD via a secure local connection. The request for consent includes a request for the types of user information which the relying party is requesting by way of the RPS. For example, the request for consent may include a request for the user's date of birth. The request for consent, in embodiments, may include a dialog in which the user is prompted to answer specific questions, via a user interface, regarding whether the user releases the specific information fields, or a set of fields, to the RPS. In specific embodiments, this dialog is referred to as a release dialog (see FIGS. 5 and 6).

The UMD verification logic 324 may be configured to enable the RPS to verify whether user information received from the UMD is valid, as set forth above in connection with online and offline MIC transactions.

The APS verification logic 326 may be configured to enable the RPS to verify whether user information received from the APS is valid. Similar to the online and offline approaches described above, the RPS can access an electronic certificate authorized by the APS, whether stored locally or remotely, to digitally verify information received from the APS that is digitally signed by the certificate used by the APS.

The memory 318 may be associated with a token/file, a verification, and data. The RPS makes use of tokens/files for trust and verification. The RPS receives the token/file from the UMD, and the RPS may be configured to pass the token/file to the APS. Thus, the RPS exchanges the token/file at the APS to receive user information. The verification represents a positive confirmation, via the use of electronic signatures/cryptography, that received information (whether from the APS or the UMD), is valid. The data represents the received user information.

FIG. 4 illustrates a UMD 110 according to an embodiment. The UMD includes a processor 410, a communication unit 412, a display unit 414, and a memory 416. The processor may be associated with logic or modules to process information, including RPS engagement logic 420, RPS information access logic 422, APS provisioning logic 424, and APS/RPS consent logic 426.

In an alternate embodiment, the UMD 110 may include removable memory, such as a Universal Serial Bus (USB) flash memory unit or micro Secure Digital (SD) flash memory card. In such embodiments, the memory of the UMD, which contains a provisioned MIC, may be separable from the UMD and/or combinable with a different UMD. In another embodiment, a memory itself serves as the UMD. In such embodiments, a user carries a portable memory UMD containing the user's MIC and/or user consent token/files. Such a portable memory UMD, in embodiments, may be a portable USB flash drive. To conduct a transaction or otherwise provide identification, the user inserts the portable memory into an RPS 130, which interprets the insertion as proximal consent to read the MIC user information (whether directly from the portable memory to the RPS in an offline mode, or indirectly by retrieving a user consent token from the portable memory and forwarding that token to an APS 120 from which the RPS receives MIC user information). In yet another embodiment, the UMD comprises a code, such as an electrically-readable code via magnet, RFID, and the like, or an optically readable code such as barcode, QR code, and the like. In such embodiments, the user conducts a transaction or otherwise provides identification by presenting the code to an RPS including a reader compatible with the code's format. In an embodiment, the RPS may include a keyboard that the user uses to manually type the code. In another embodiment, the RPS may include a card reader to read the code contained in or on a card-format UMD, whether electronically, magnetically, or optically encoded on the card. The RPS reader can verify such identities by using those forms of identity to retrieve biometric information from the APS and performing a comparison with the user to verify that the MIC belongs to that user. In yet another embodiment, the UMD may be a personal identity verification (PIV) card.

The RPS engagement logic 420 may be configured to enable the UMD to establish the secure local connection with the RPS, as set forth above with respect to the description of FIG. 3.

The RPS information access logic 422 may be configured to enable the UMD to allow the RPS to access the MIC user information associated with the MIC (whether stored at the UMD for offline mode access or stored at the APS for online mode access). In the context of allowing access to MIC user information stored on the UMD, passive access involves the UMD enabling the RPS to read data from the UMD. Active access involves the UMD transmitting data to the RPS. Allowing access furthermore may include the UMD authorizing release of MIC user information from the APS to the RPS, which similarly involves passive or active access between the RPS and the APS. The RPS information access logic 422 may be responsive to the UMD information request logic, as set forth above with respect to the description of FIG. 3.

The APS provisioning logic 424 may be configured to enable the UMD to receive a MIC from the APS and store the received MIC securely on the UMD. The APS provisioning logic may be responsive to the MIC generator as set forth above and as described in connection with FIG. 2. In an embodiment, the APS provisioning logic communicates with the APS to indicate readiness for provisioning the MIC from the APS onto the UMD. In some embodiments, the APS provisioning logic may be configured to provision multiple MICs onto the UMD. For example, the APS provisioning logic provisions a first MIC corresponding to a mobile Driver's License (mDL), and a second MIC corresponding to some other ID or proof such as, e.g., proof of residency and/or citizenship in cases where residency and/or citizenship are components of the vetting process. The UMD stores the MIC in the memory as illustrated, including the various information of the MIC such as the BGI, BMI, and OI.

The APS/RPS consent logic 426 may be configured to enable the UMD to receive requests for the consent and release of MIC information. The APS/RPS consent logic may be configured to generate, responsive to received requests, corresponding compartmentalized and/or discrete prompts for the user's consent to selectively indicate approval to release such MIC information. In an example, the APS/RPS consent logic 426 may be configured to interact with the UMD information request logic, as set forth above and described in connection with FIG. 3. In an embodiment, the APS/RPS consent logic receives the user's selective consent and sends the consent to the APS whereby the APS acts in accordance with the consent. In another embodiment, the APS/RPS consent logic receives the user's selective consent and directs the UMD to selectively release the MIC user information in accordance with the consent.

The memory 416 may be associated with at least one MIC and a Token/File. The MIC includes MIC user information such as Biographic Information (BGI), Biometric Information (BMI), and Other Information (OI) such as privileges. The Token/File may include a consented data indication. In an offline embodiment, the APS/RPS consent logic obtains consent and transmits the requested BGI, BMI, and/or OI (e.g., using a secure communication link and a verification protocol to digitally sign the requested information) from the UMD to the RPS. In an online embodiment, the APS/RPS consent logic obtains consent and transmits, to the APS, the token/file (as stored in the memory) which contains a consented data indication. The token/file does not actually contain the requested MIC information. Rather, the token/file may include the consented data indication which indicates which of the user's MIC information is authorized for release by the APS. Such consented data indication may be used by the RPS. The RPS passes the consented data indication to the APS, which exchanges the token/file for the MIC user information that is consented to be released. The APS then releases to the RPS (e.g., allows access by the RPS) the consented MIC user information.

As used herein, a UMD is not required to be mobile. It is meant to encompass stationary devices such as desktop computers and portable devices such as laptop and notebook computers as well as mobile telephones. In a specific embodiment, the requested MIC may be transmitted from the APS to a stationary intermediary device, which serves as the UMD that subsequently transmits the MIC to a user mobile telephone. This is a typical example of a request made from a remote location such as a person's home using the person's computer as the UMD.

In addition, while the above describes that the user uses the UMD to interact with the vetting system to request vetting by verifying the identity of the user, other ways of verifying the identity of the user are possible. In one embodiment, the user presents to the RPS the MIC in the form of a computer-readable storage medium such as a USB dongle instead of a UMD. For example, the storage medium may be a removable memory from the UMD. In such a scenario, the RPS may be configured to read the MIC from the user's storage medium and, optionally, receives input from the user via a user interface consenting to access part of all of the MIC information and/or decrypting the stored data if necessary. At the end of the user identity verification process, when all verifications are done, the RPS performs the vetting and the result is transmitted to the user's storage medium.

In yet another embodiment, instead of using a UMD or a computer-readable storage medium, the user may present to the RPS, in person or remotely, an electronic key or digital code, which the RPS can use to access the user's MIC stored in a third-party storage medium, such as a cloud storage medium. At the end of the user identity verification process, when all verifications are done, the RPS completes vetting the subject and determines whether the subject passes or fails and store the result in the third-party storage medium.

Figure 5:
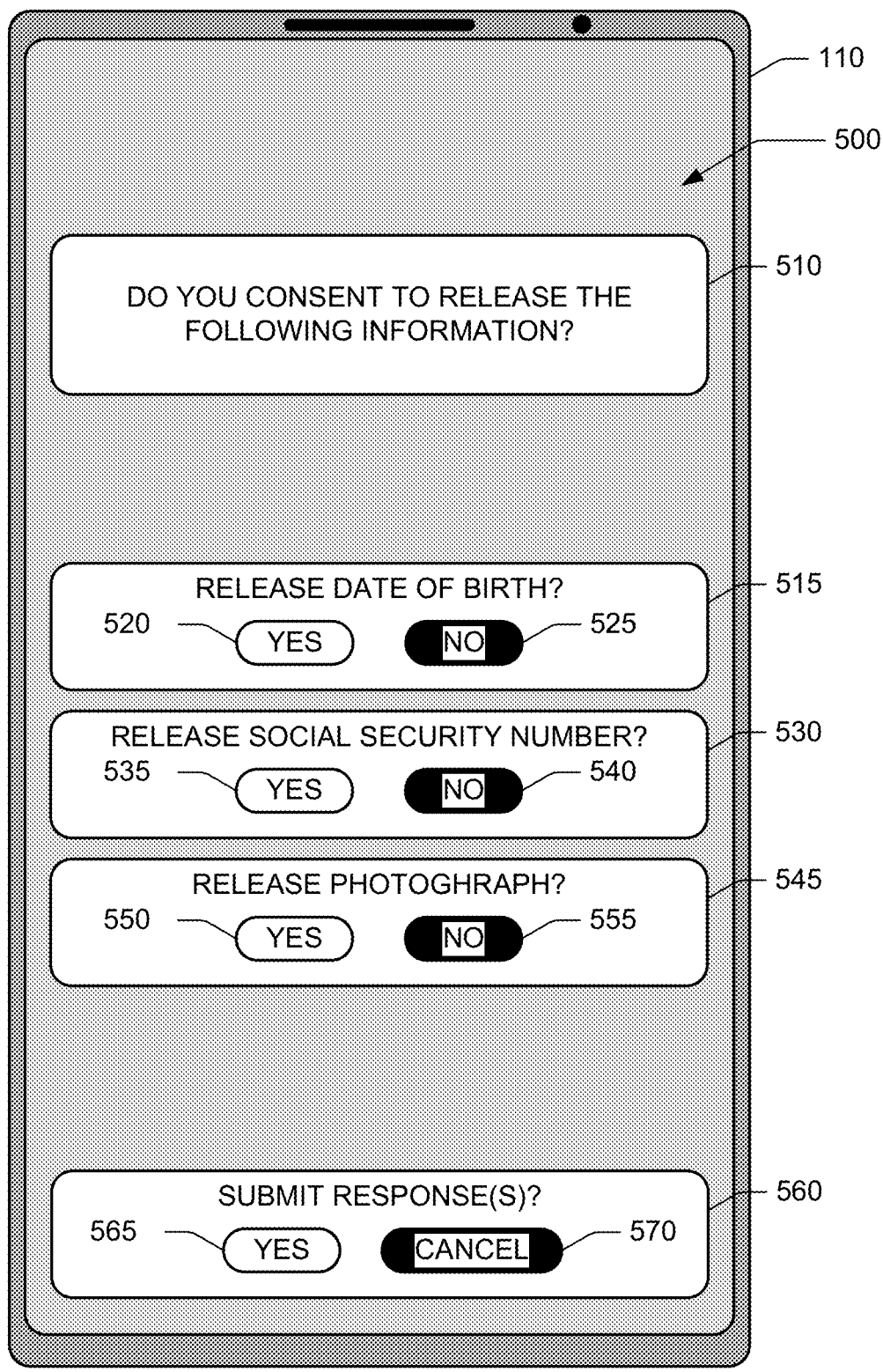
FIG. 5 illustrates a privacy dialog according to an embodiment.

FIG. 5 illustrates a privacy dialog 500 according to an embodiment. The privacy dialog 500 facilitates interaction between a user and the UMD 110, enabling the user to consent to release selectively the MIC user information. In embodiments, the UMD 110 provides the privacy dialog 500 via APS/RPS consent logic running on the UMD 110.

The privacy dialog 500 may include an information prompt 510, individual release prompts 515, 530, 545, and a submit prompt 560. The various prompts enable the user to view easily which specific MIC information is requested by the RPS, and selectively grant consent to those prompts to which the user agrees, while selectively denying consent to those prompts to which the user does not agree. The release prompts may include YES/NO radio buttons (520/525, 535/540, and 550/555), which are illustrated in a default selection of NO to encourage a security-centric option that protects the user's MIC information from release by default. If the user agrees to release a given piece of MIC user information, the user selects the YES button in the release prompt corresponding to that MIC information.

The multiple different prompts provide a readily appreciated interface for the user to understand easily exactly which types of MIC user information the RPS is requesting to be released by the UMD 110. Furthermore, the ability to selectively provide or withhold consent to different types of requests provides the user with a sense of control and feeling of safety, that only the particular displayed agreed-upon portion of the user's MIC information will be released.

When the various YES/NO radio buttons are configured to the user's satisfaction, the user interacts with the submit prompt 560 to indicate that the user is ready to release the indicated selective MIC information. As illustrated, the user presses a YES button 565 to submit the user's selective consent as indicated in the release prompts 515, 530, 545. As set forth above, the UMD 110 then releases the user consent response (e.g., as a token) and/or the actual MIC user information stored on the UMD 110 (e.g., in an offline embodiment). If the user does not agree to submit responses, the user presses the cancel button 570.

Figure 6:
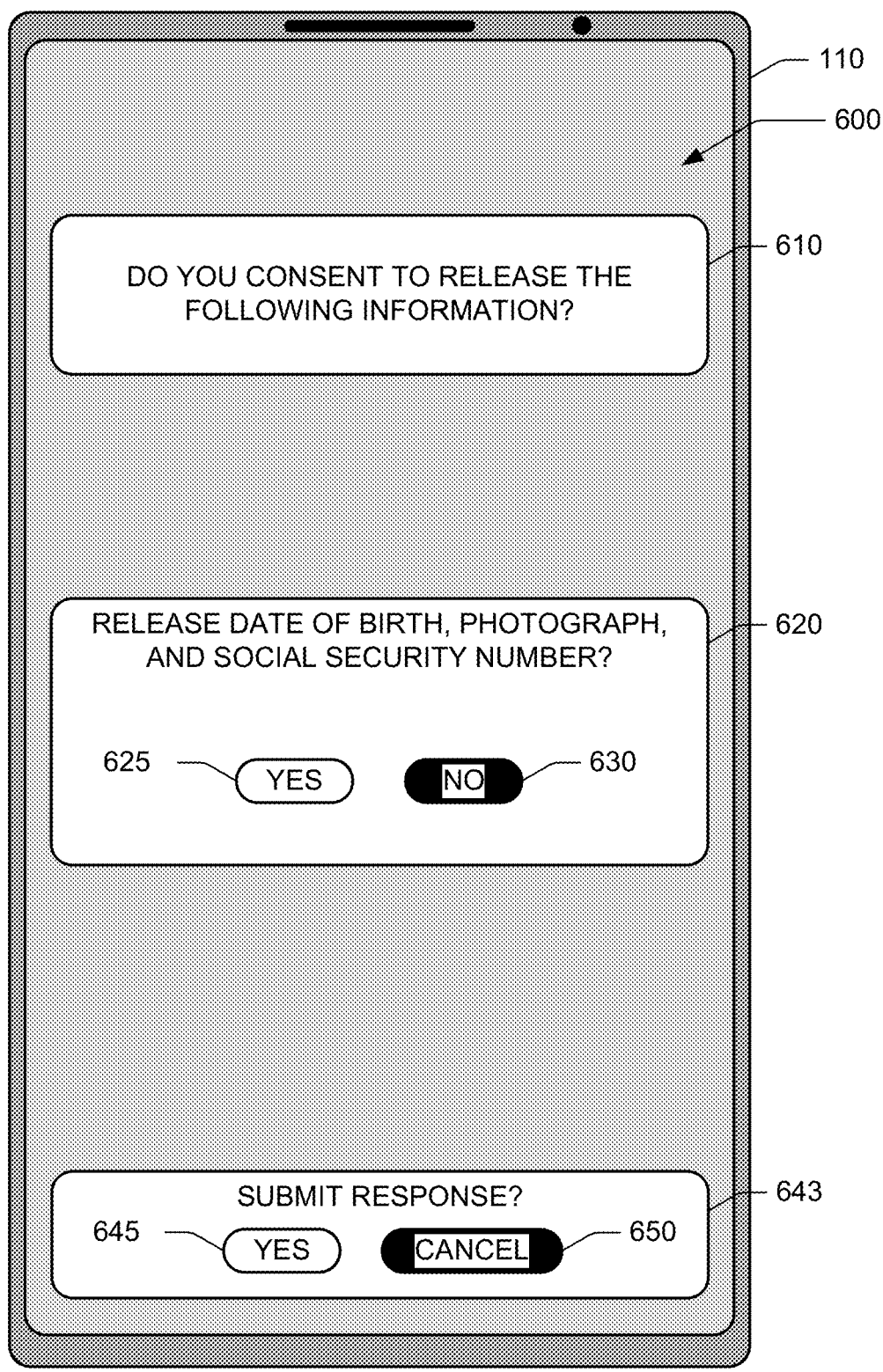
FIG. 6 illustrates a privacy dialog according to an embodiment.

FIG. 6 illustrates a privacy dialog 600 according to another embodiment. The privacy dialog 600 facilitates interaction between a user and the UMD 110, enabling the user to grant selective consent to release MIC user information. In embodiments, the UMD 10 provides the privacy dialog 600 via APS/RPS consent logic running on the UMD 110.

The privacy dialog 600 may include an information prompt 610, a combination release prompt 620, and a submit prompt 643. The combination release prompt 620 enables the user to view easily which specific MIC information is requested by the RPS. Furthermore, in the illustrated embodiment, the combination release prompt 620 serves as an indication to the user that this particular RPS requests an "all or nothing" approach to obtaining consent. For example, unless the user agrees to provide all three types of requested MIC user information for vetting, the vetting request will be denied or the user will fail the vetting. Accordingly, the combination release prompt 620 seeks consent to release all three types of MIC user information. Such presentation saves time for the user by needing only a single consent selection, while also communicating the nature of the RPS request being of an "all or nothing" type. The combination release prompt 620 may include a YES/NO radio button (625/630), which is illustrated in a default selection of NO to encourage a security-centric option that protects the user's MIC information from release by default. If the user agrees to release the combination of MIC information, the user selects the YES button 625 in the combination release prompt 1920.

The user interacts with the submit prompt 643 to indicate that the user is ready to release MIC user information. As illustrated, the user presses a YES button 645 to submit the user's combination consent as indicated in the combination release prompt 620. If the user does not agree to submit, the user presses the cancel button 650.

Figure 7:
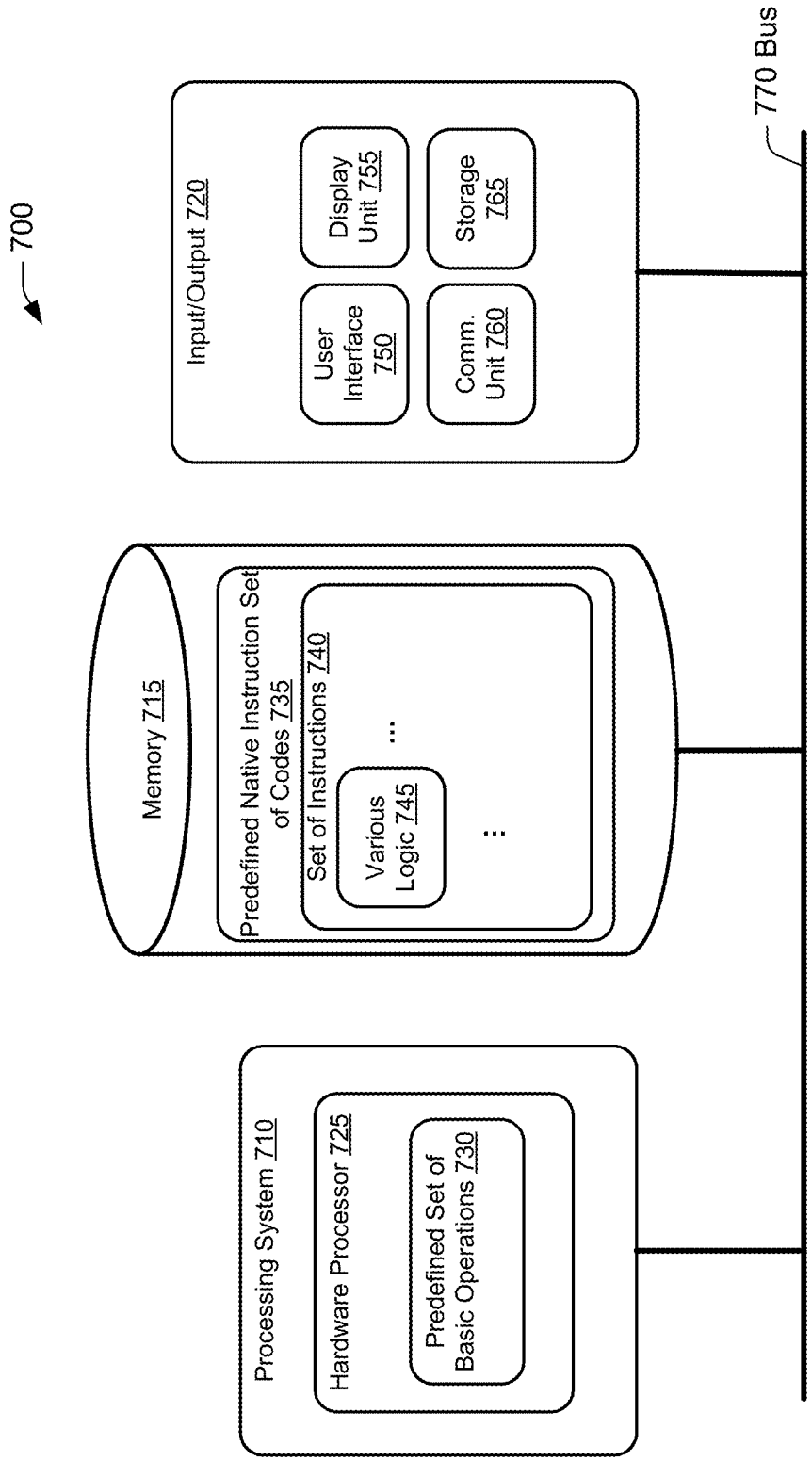
FIG. 7 illustrates a computing system including logic according to an embodiment.

FIG. 7 illustrates a computing system 700 including logic according to an embodiment. The computing system 700 includes a processing system 710 having a hardware processor 725 configured to perform a predefined set of basic operations 730 by loading corresponding ones of a predefined native instruction set of codes 735 as stored in the memory 715. The computing system 700 further includes input/output 720 having user interface 750, display unit 755, communication unit 760, and storage 765.

The memory 715 is accessible to the processing system 710 via the bus 770. The memory 715 includes the predefined native instruction set of codes 735, which constitute a set of instructions 740 selectable for execution by the hardware processor 725. In an embodiment, the set of instructions 740 include logic 745 representing the APS 120 as illustrated in FIG. 2, including the MIC generator 220, the verification system 222, and the verification API 224. In another embodiment, the set of instructions 740 include logic 745 representing the RPS 130 as illustrated in FIG. 3, including the UMD engagement logic 320, the UMD information request logic 322, the UMD verification logic 324, and the APS verification logic 326. In yet another embodiment, the set of instructions 740 include logic 745 representing the UMD 110 as illustrated in FIG. 4, including the RPS engagement logic 420, the RPS information access logic 422, the APS provisioning logic 424, and the APS/RPS consent logic 426. Such logic 745 also is set forth below in greater detail with respect to the flow diagrams illustrated in FIGS. 15-20.

The various logic 745 is stored in the memory 715 and comprises instructions 740 selected from the predefined native instruction set of codes 735 of the hardware processor 725, adapted to operate with the processing system 710 to implement the process or processes of the corresponding logic 745.

Process Embodiments

Verifying Information of the Subject Using MIC

To verify the identity of the user/subject, the RPS 130 requests user ID information of the user, which may include some or all of the content of the MIC. The user has the option of consenting to release selectively some or all of the requested information. It may include age and residency information (e.g., utility bills to establish residency), and may further include citizenship information (e.g., passport or birth certificate to establish citizenship), etc. If the information provided appears suspicious, additional information may be required. For instance, the user's mobile device may provide the location history and travel pattern that can be used as evidence to support the user's residency claim (consistent evidence) or refute the user's residency claim (inconsistent evidence).

Figure 8:
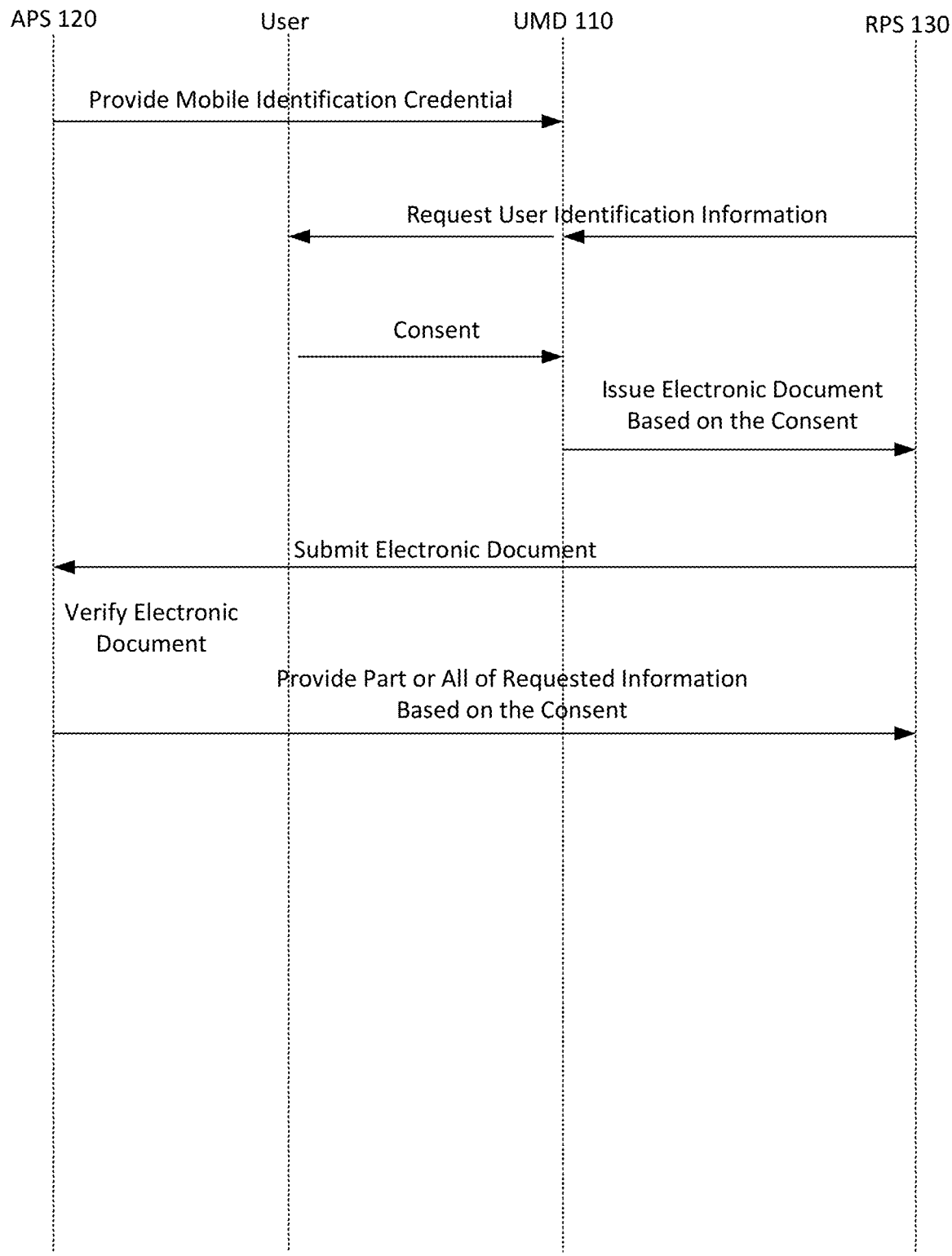
FIG. 8 illustrates verifying information of a subject requesting to be vetted using a MIC according to an embodiment.

In an embodiment illustrated in FIG. 8, the user of the UMD 110 submits a vetting request to the RPS 130. In response to a request for user ID information from the RPS 130, the UMD 110, having received the MIC from the APS 120, may issue an electronic document or a digital file such as a digital certificate or a key with consented data indication, based on the user's consent, to the RPS 130. The relying party may be the vetting service or some other entity that conduct background checks. The RPS 130 may submit the electronic document to the APS 120. Upon verification of the electronic document, the APS may provide some or all of the requested information which is associated with the MIC to the RPS 130, as determined by the scope of the consent. For instance, if establishing user identity is the only concern, the user may choose to release only information sufficient to establish identity and none of the other information that is not relevant (such as age, race, gender, national origin, passport, birth certificate, etc.). When the identity of the user is verified to the satisfaction of the relying party, the RPS 130 will vet the user/subject to determine whether the subject passes or fails the vetting. A similar process may be employed when the request is made by the user from a remote location. When the received electronic document is not verified by the APS, the APS 120 sends the UMD 110 a notification to resubmit the request for user ID information.

Figure 9:
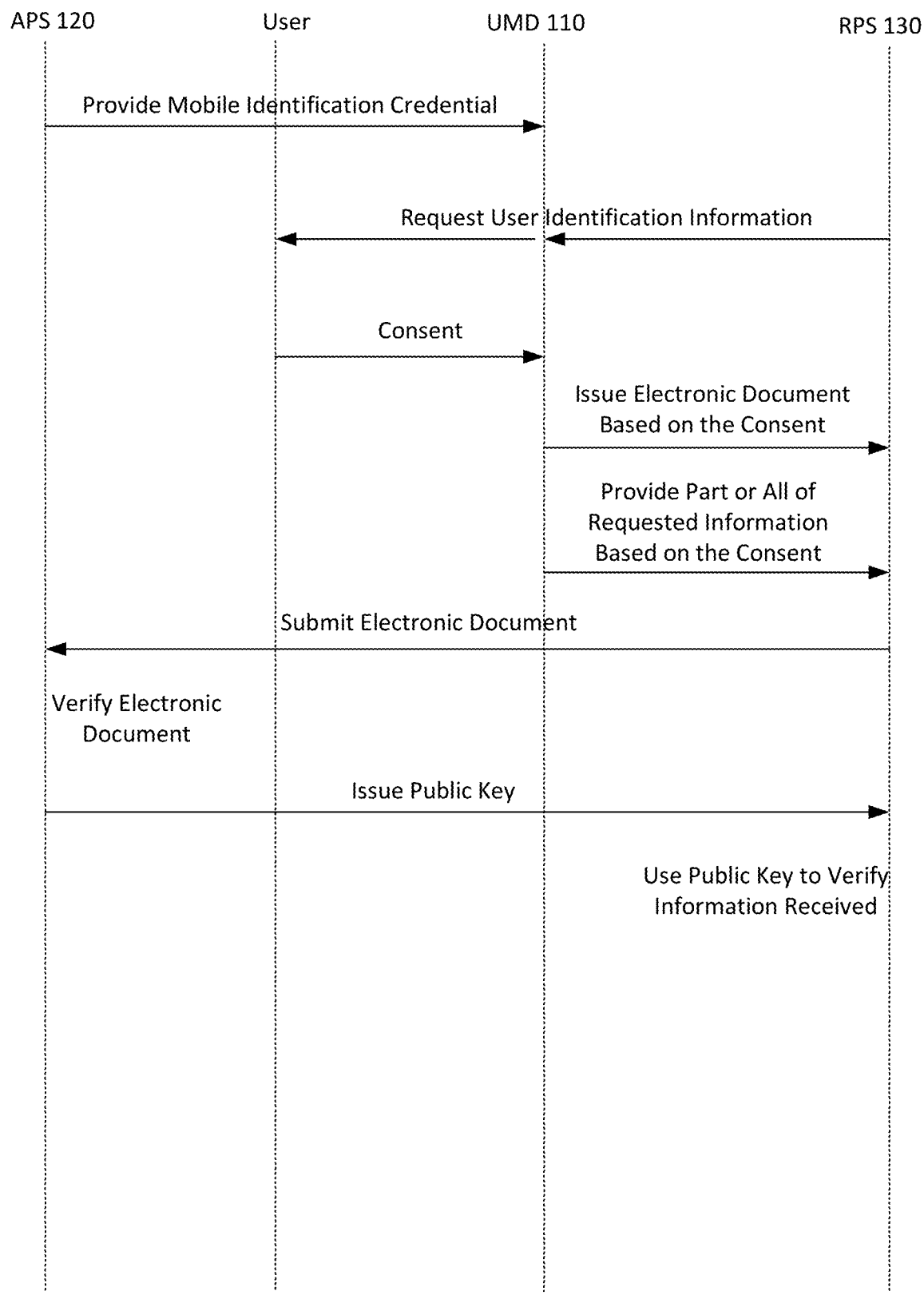
FIG. 9 illustrates verifying information of a subject requesting to be vetted using a MIC according to another embodiment.

In another embodiment illustrated in FIG. 9, the UMD 110, having received the MIC from the APS 120, receives a request for user ID information from the RPS 130. In response, the UMD 110 may issue an electronic document or a digital file, based on the user's consent, to the RPS 130. In addition, the UMD 110 may provide to the RPS 130 part or all of the requested information, which is associated with the MIC, based on the consent. The RPS 130 may submit the electronic document to the APS 120. Upon verification of the electronic document, the APS 120 may issue a public key to the RPS 130. The RPS 130 may use the public key to verify the information received from the UMD 110. In specific embodiments, the information was encrypted or digitally signed using a private key and the public key is used to decrypt the encrypted information or read the digitally signed information. When the identity of the user is verified, the RPS 130 can vet the subject.

In some instances, the RPS 130 does not have to submit anything to the APS 120 to obtain the public key. In general, the only time the RPS 130 will have to go to the APS 120 is to refresh the public keys. In some cases, there may be a public key distributor (PKD). The distributor would be an agent acting on behalf of several trusted entities.

The use of a public key to authenticate a digital signature or the like is merely an example. In other embodiments, the APS 120 may issue another electronic document or digital file or the like (e.g., referred to as an "authentication key") which the RPS 130 can use to verify that the information received from the UMD 110 can be trusted to establish the identity of the user (i.e., to verify the authenticity of the information received). In one example, the authentication key may be a public key that refreshes after a very short time, thereby requiring the RPS 130 to reach out to the APS 120 when it is time to verify the information and use the public key with a short lifespan before it expires.

When the received electronic document is not verified by the APS, the APS 120 may send the RPS 130 a notification to resubmit the request for identification information of the subject/user. When the identity of the user is verified to the satisfaction of the relying party, the RPS 130 can vet the user/subject to determine whether the subject passes or fails the vetting.

Figure 10:
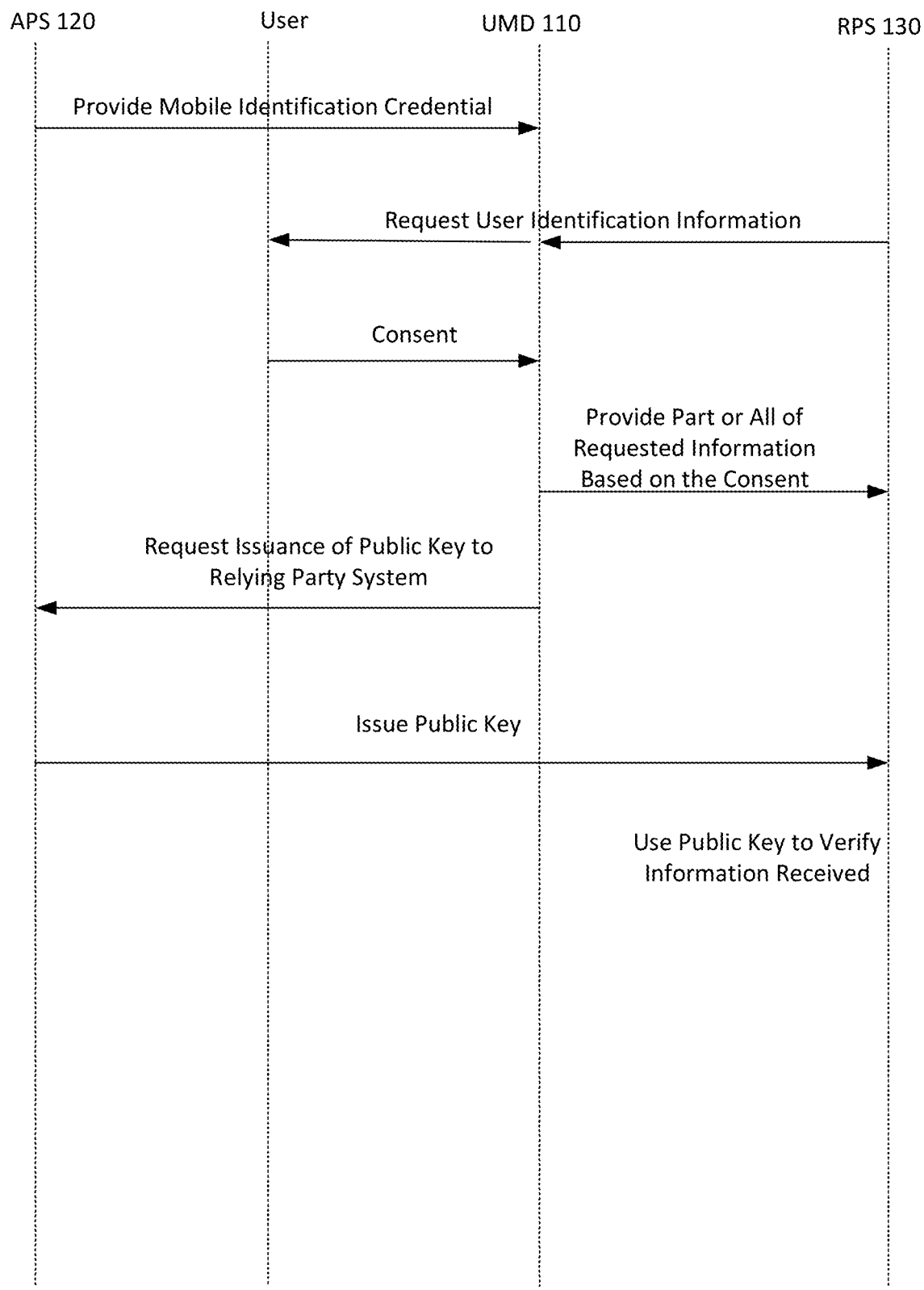
FIG. 10 illustrates verifying information of a subject requesting to be vetted using a MIC according to another embodiment.

In another embodiment illustrated in FIG. 10, the UMD 110, having received the MIC from the APS 120, receives a request for user ID information from the RPS 130 and provides part or all of the requested information associated with the MIC to the RPS 130 based on the user's consent. The UMD 110 may request that the APS 120 issue a public key to the RPS 130. The APS 120 may issue the public key to the RPS 130, which uses the public key to verify the information received from the UMD 110. Again, the public key is merely an example. It can be replaced with another electronic document or digital file or the like (e.g., "authentication key") which the RPS 130 can use to verify that the information received from the UMD 110 can be trusted to establish the identity of the user. When the identity of the user is verified to the satisfaction of the relying party, the RPS 130 can vet the user/subject to determine whether the subject passes or fails the vetting.

Figure 11:
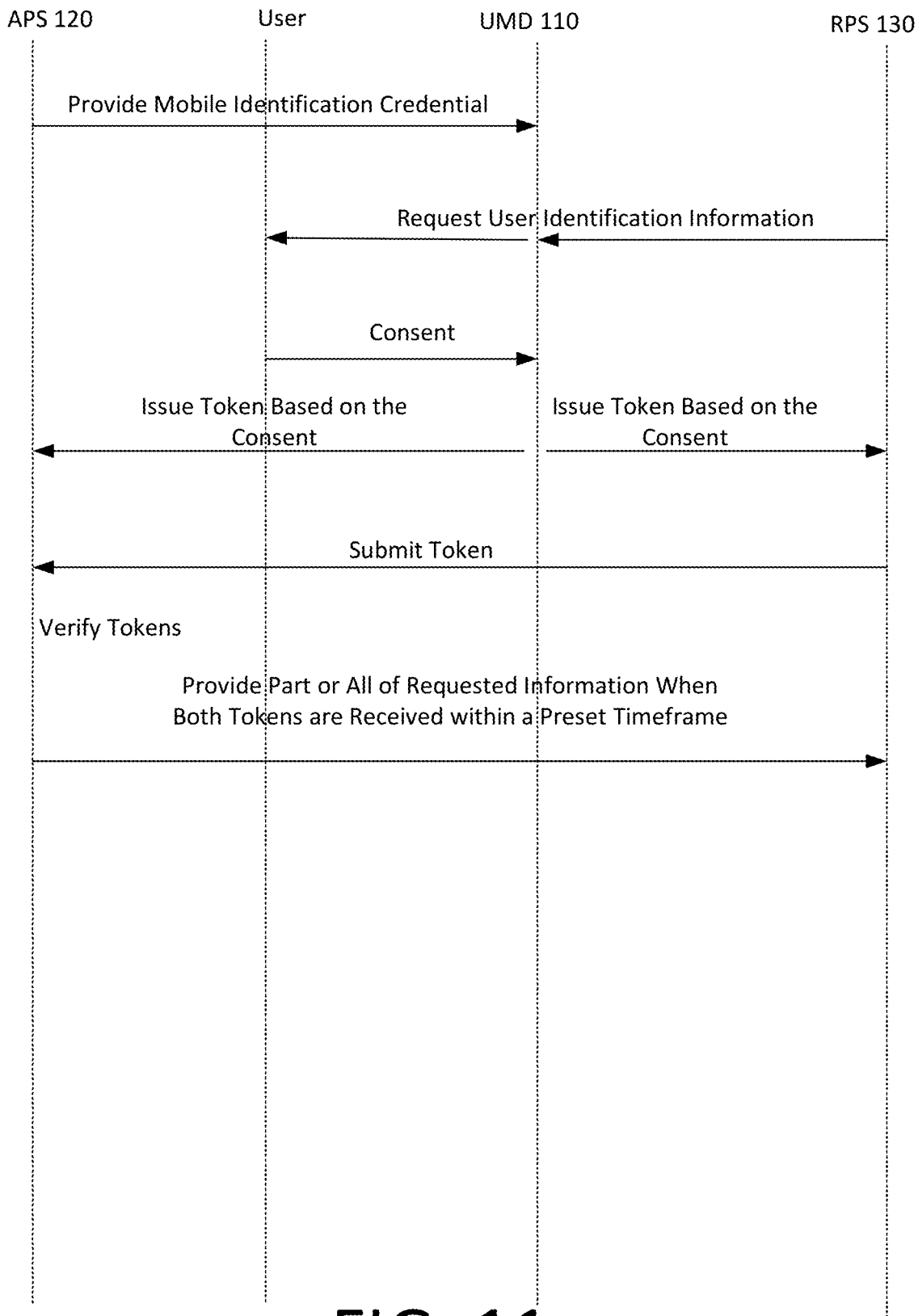
FIG. 11 illustrates verifying information of a subject requesting to be vetted using a MIC according to another embodiment.

In another embodiment illustrated in FIG. 11, the UMD 110, having received the MIC from the APS 120, receives a request for user ID information from the RPS 130. In response, the UMD 110 may issue, based on the user's consent, a token to the RPS 130 and another token to the APS 120. The RPS 130 may submit the received token to the APS 120. When both tokens are received within a preset timeframe (e.g., within 30 minutes, within 10 minutes, within 3 minutes, within 1 minute, within 30 seconds, etc.) and are matched or otherwise verified by the APS, the APS 120 may provide part or all of the requested information associated with the MIC to the RPS 130. When the tokens are not received by the APS within the preset timeframe or are not verified by the APS, the APS 120 may send a notification to the RPS 130 to resubmit the request for ID information of the user. When the identity of the subject is verified to the satisfaction of the relying party, the RPS 130 can vet the user/subject.

In an embodiment, when the user requests the item from a remote location or at an unattended kiosk, the system may incorporate a liveness check as described above. The liveness check ensures that the person making the request for the vetting via the UMD 110 is the proper user of the UMD 110 instead of someone else who has taken control of or gain access to the UMD 110 or instead of a bot.

Figure 12:
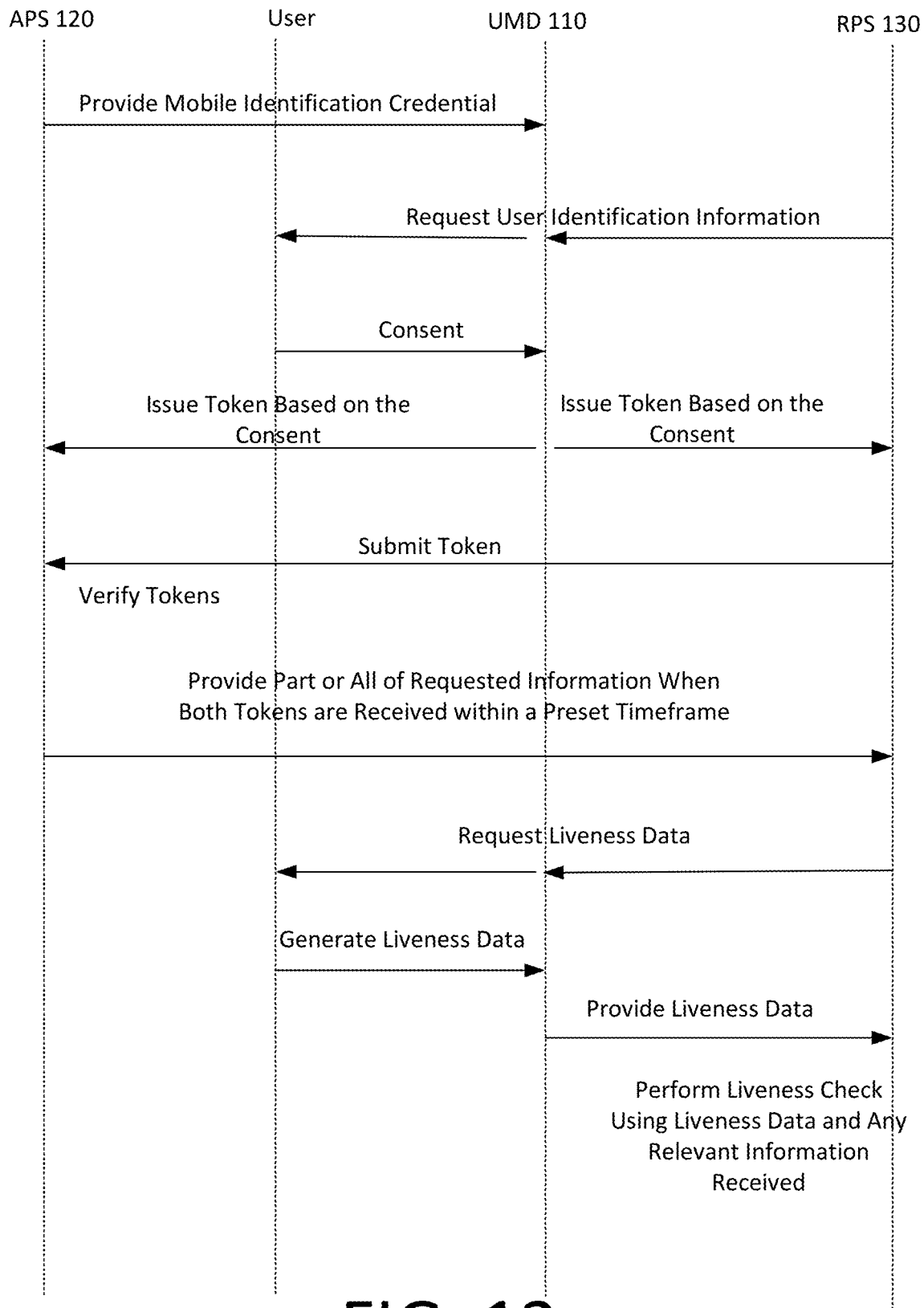
FIG. 12 illustrates performing a liveness check of a subject submitting a vetting request according to an embodiment.

In another embodiment illustrated in FIG. 12, which builds upon FIG. 11, the RPS 130 requests liveness data from the UMD 110. The user may generate the liveness data using the UMD 110, which provides the liveness data to the RPS 130. Examples of the liveness data include a live facial image, a live video, a live iris or retina scan, and a live fingerprint scan of the user taken using the UMD 110. While a liveness check that involves biometrics is generally more reliable, it does not require biometrics and can involve taking certain live actions that can be detected and verified. The RPS 130 performs the liveness check using the liveness data and any relevant information received (e.g., comparing the live image or video with a photograph of the user contained in the MIC). While the embodiment illustrated in FIG. 9 shows that the liveness check is performed after the identity verification process, the order can be reversed in other embodiments.

Figure 13:
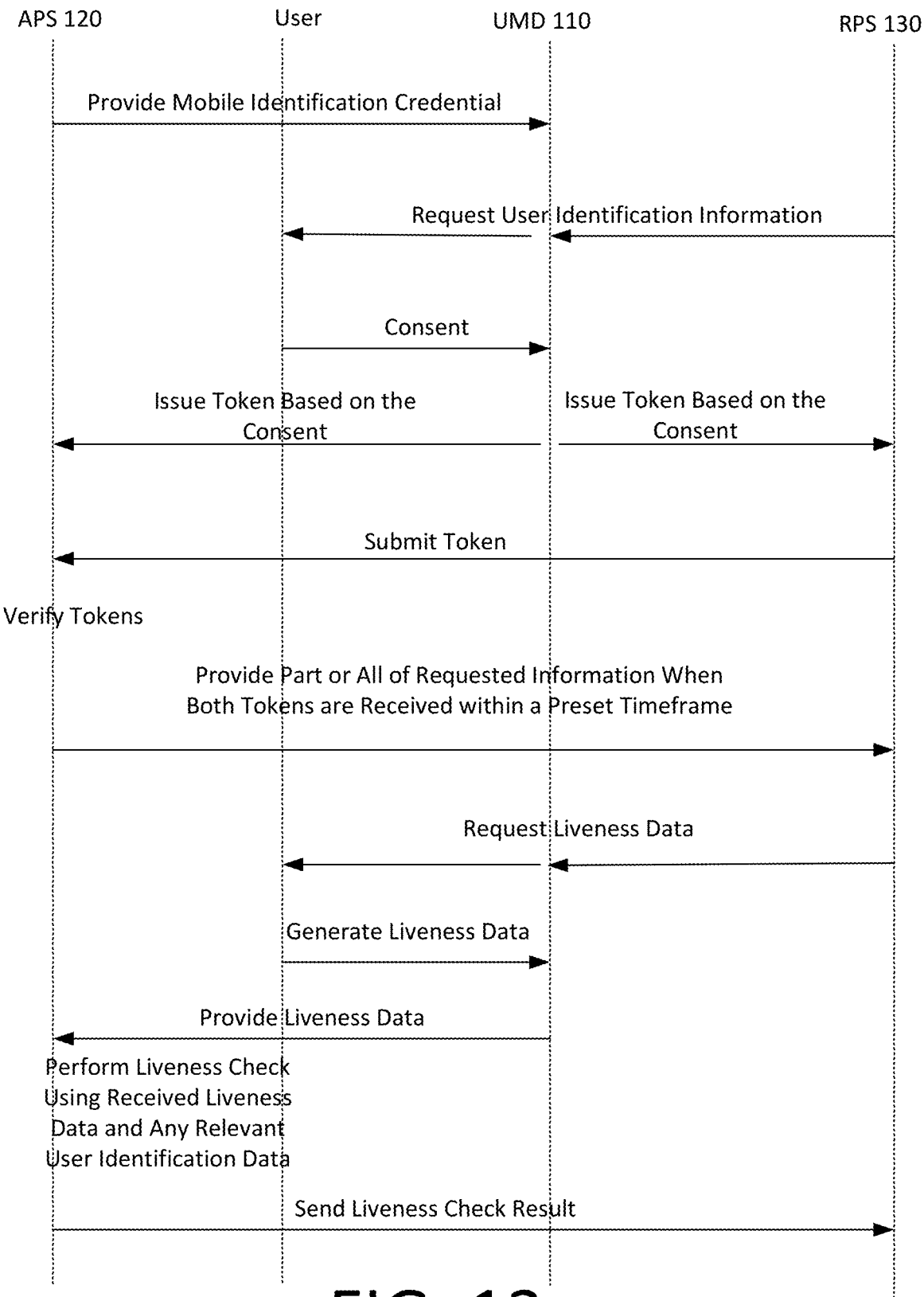
FIG. 13 illustrates performing a liveness check of a subject submitting a vetting request according to another embodiment.

In another embodiment illustrated in FIG. 13, which builds upon FIG. 11, the RPS 130 requests liveness data from the UMD 110. The user may generate the liveness data using the UMD 110, but instead of providing the liveness data to the RPS 130 as in FIG. 12, the UMD 110 provides the liveness data to the APS 120. The APS 120 may perform the liveness check using the received liveness data and any relevant user information such as stored user ID data (e.g., contained in the MIC), and sends the liveness check result to the RPS 130.

Other embodiments of identity verification are possible. For instance, different features of the processes of FIGS. 8-13 can be combined to create new embodiments.

The embodiments in FIGS. 8-13 show devices that connect to the APS 120, e.g., via the Internet, during the request for vetting. The RPS 130 can obtain, directly from the APS 120, the MIC information (FIGS. 5 and 8) or a public key or some other electronic document or digital file to verify the authenticity of the MIC information that the RPS 130 has received (FIGS. 6 and 7). Signer Certificates or the like from a Trust List can be used to validate the Base URLs of the APS 120.

When there is no connection with the APS during the request for vetting, local transmission links between the UMD 110 and the RPS 130 can be made through directed action by the UMD 110 such as a tap or showing a QR code to the RPS 130. The connection may then be secured by standardized key exchange and encryption of the transport of data. The RPS 130 can verify that the data received from the UMD 110 is valid and unchanged using Signer Certificates from a Trust List, or the public key of the APS which is available, or the like. The process ensures that the MIC information received by the RPS 130 from the UMD 110 was not cloned from another, different UMD.

Vetting the Subject Using Multiple Confidence Levels Based on Linked MICs

A person/applicant under consideration for access to protected information, referred to here as a subject, renders background data for consideration by a reviewer—a government representative tasked with determining whether to grant the access. The reviewer, equipped with the background data provided by the subject, relies also on one or more investigators who interview the subject and others to build a set of supplemental data. The supplemental data informs the decision of the reviewer to grant or deny the access.

Investigators obtain supplemental data about a subject from a widespread array of official sources. Such sources of supplemental data include departments of the national government, state or provincial government offices, and non-government, private entities such as businesses, associations, clubs, or individuals. The number and types of these supplemental data sources vary for each subject. To aid the process, the subject in some situations furnishes the reviewer with a document that provides a blanket approval for cooperation with the reviewer's vetting of the subject. The reviewer, for example, then proffers this blanket pre-approval document to supplemental data sources to prove the subject's consent to release the subject's information.

The supplemental data collected from these sources is in some examples obtained in electronic form through an automated process. Such a process generally involves an official request, on behalf of the review, to a supplemental data source. The supplemental data source evaluates the request and, if present, the blanket pre-approval document, and determines whether to furnish information about the subject. The supplemental data source also often determines what information it will furnish.

In this context, the supplemental data sources are useful to the reviewer in vetting the subject because the subject has a relationship with the supplemental data source, referred to here as a supplemental relationship. The collection of supplemental relationships of the subject, taken together with the background data and other supplemental data gathered by investigators, helps the reviewer establish a composite view of the subject's identity. Here, the identity of a subject is discussed in terms of whether the subject is a person mentioned in the background data, whose past activities are consistent with the supplemental data.

One embodiment of an improved system for government vetting of a subject assigns each supplemental data source a respective confidence coefficient. This confidence coefficient represents the level of confidence the reviewer gives or can give to supplemental data obtained from the supplemental data source. The assignment of confidence coefficients to supplemental data sources permits data from a wider variety of supplemental data sources to be considered. For example, supplemental data from a subject's state department of motor vehicles (DMV) has a higher confidence coefficient that a subject's homeowner's association (HOA). The DMV supplemental data is from an official source, whereas the HOA supplemental data is non-official. Without the use of confidence coefficients, the HOA supplemental data might be considered untrustworthy and be discarded. Using the HOA supplemental data, however, helps the reviewer have a dossier of the subject that is more complete while, at the same time, weighting the information accordingly.

The use of confidence coefficients also enables, in another embodiment, use of data that is not typically accessed during vetting. For example, UMD data collected through a subject's smartphone or the like can indicate patterns of individual movement such as how a person walks, patterns of travel such as where a user goes, and patterns of online behavior. Lacking any convenient way to provide such UMD data to an investigator or reviewer, however, has prevented subjects from making the data available to support their vetting process.

To implement the sharing of UMD data, in an embodiment, the subject interacts with an online government vetting system. The government vetting system invites the subject to provide UMD data such as patterns of travel recorded in the subject's UMD, such as GPS data. The subject interacts with a release program, also referred to as a release app, on their UMD. The release app, in some embodiments, implements a user interface that displays an interactive release dialog (see, e.g., FIGS. 5 and 6).

In embodiments, the interactive release dialog accepts user inputs that indicate what discrete information components the subject agrees to release to the government vetting system. For example, the subject agrees that the release app can generate patterns of travel UMD data but not patterns of online behavior UMD data. In an embodiment, the UMD requires the subject to verify himself or herself to validate that the person holding the UMD is in fact the subject. In another embodiment, the verification may use biometric information such as a scan of the subject's face or fingerprint. In another embodiment, the verification may further include a liveness check such that a live image or video of the subject is captured for the biometric verification.

UMD data gathered from a subject's smartphone or the like may be used in association with a confidence coefficient that reflects the trustworthiness of the UMD data. In embodiments, the UMD data from the UMD has a high confidence coefficient because of the difficulty in fabricating such data coupled with the biometric verification of the owner of the UMD. A higher confidence coefficient leads to a higher trust score for the associated data, which is weighted more strongly, than a lower confidence coefficient.

Access to UMD data improves the reviewer's composite understanding of the identity of the subject. The subject's behavior in the digital world helps build a record that confirms or is at odds with the background data furnished by the subject, and the supplemental data developed by the investigators. For example, UMD data on patterns of travel can be weighted strongly as data that can be trusted to reflect where a person resides. By compiling information from different sources with different confidence coefficients, a composite trust score can be calculated that takes into account various information in the vetting process, including the digital footprint of the subject.

In other embodiments, the subject's ability to aid the vetting process is improved by leveraging a mobile identification credential (MIC). This employs, in an embodiment described below, an environment that supports linked credentials. In this environment, the RPS interacts with the UMD to request information desired by the relying party, as described above in connection with FIGS. 8-13.

In an embodiment, this environment also provides for linked credentials. Linked credentials may be credentials issued by other authorizing parties on the basis of a base identity provided by the first authorizing party. For example, a subject has a MIC provisioned by their state DMV, such as an mDL, referred to in this example as MIC-0. The subject opens a bank account and proffers MIC-0 to establish their identity with the bank. The bank acts as the relying party and interacts with the state DMV acting as the authorizing party as mentioned above.

The bank, satisfied with the information, issues the subject a MIC from the bank, such as a mobile banking card, referred to in this example as MIC-1. Here, the bank acts as the authorizing party that provisions MIC-1 to the subject's UMD. Since MIC-1 is created on the basis of the content of MIC-0, MIC-0 is the base identity credential on the UMD, and MIC-1 is a linked credential of MIC-0. Any arbitrary number of credentials can be linked, providing a set of mobile identification credentials MIC-0 to MIC-n (meaning zero through "n" where n is an integer), i.e., MIC-0, MIC-2, . . . MIC-i, . . . MIC-n. This is also referred to as a set of identities.

Each of the identities, in embodiments, has attributes. For example, the MIC-0 provisioned by the state DMV may include a driver attribute that indicates whether the subject must wear corrective lenses when operating a vehicle; the MIC-1 provisioned by the bank may include an account attribute that indicates an account number for the subject's account.

Linked credentials allow a subject undergoing vetting to have a higher level of control over what information is released to the government, as part of the vetting process, than that afforded by the blanket pre-approval document. In an embodiment, the subject interacts with an online vetting system. The online vetting system invites the subject to provide background data on the subject's bank accounts as part of the process. Not all vetting requires such information; this is only an example. In this instance, the subject has already used MIC-0 (the mobile driver's license) to verify themselves to the online vetting system. Because the subject's bank credential MIC-1 is previously linked with MIC-0, the vetting system initiates a release dialog with the subject whereby the subject provides a release to the bank, of the bank information to the online vetting system. The release dialog provides for discrete information release such that the subject can select whether the bank releases account balance information only, or also individual transaction information, or also restricts the timeframe for which such transactions are to be released. For example, if the online vetting system requests transactions from the prior year, the release dialog affords the subject the ability to select this timeframe.

Figure 14:
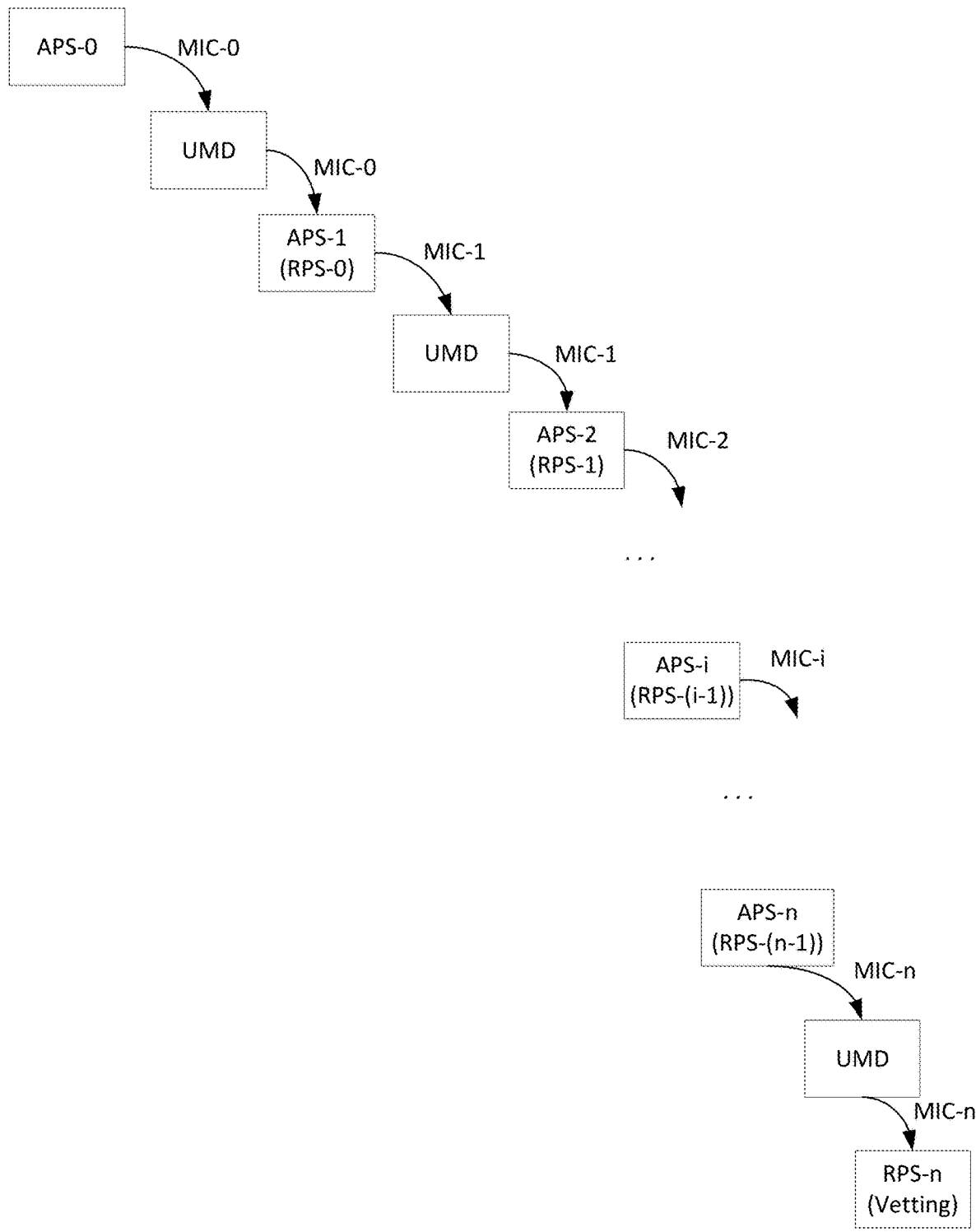
FIG. 14 is a block diagram illustrating the creation of linked credentials.

FIG. 14 is a block diagram illustrating the creation of linked credentials. APS-0 issues MIC-0 (base identity credential) to the UMD which provides the MIC-0 to RPS-0 for verification. RPS-0 records the MIC-0 attributes of the received MIC-0 (base attributes). Next, RPS-0 becomes APS-1, creates MIC-1 on the basis of the content of MIC-0, and issues MIC-1 to the UMD which provides the MIC-1 to RPS-1 for verification. RPS-1 records the MIC-1 attributes of the received MIC-1. RPS-1 becomes APS-2, creates MIC-2 on the basis of the content of MIC-1, and issues MIC-2 to the UMD. The linked credentials continue from MIC-2 to MIC-i issued by APS-i to MIC-n issued by APS-n to the UMD which provides the MIC-n to RPS-n which is the vetting system as the n-th relying party. The credentials MIC-0 through MIC-n may be linked to provide a set of mobile identification credentials, MIC-0 to MIC-n. Linked credentials allow a subject undergoing vetting to have a higher level of control over what information is released to the vetting system, as part of the vetting process, than that afforded by the blanket pre-approval document. In another embodiment, the RPS-n receives the linked credentials and transfers the information to a separate vetting system. The relying party system is separate from the vetting system.

Figure 15:
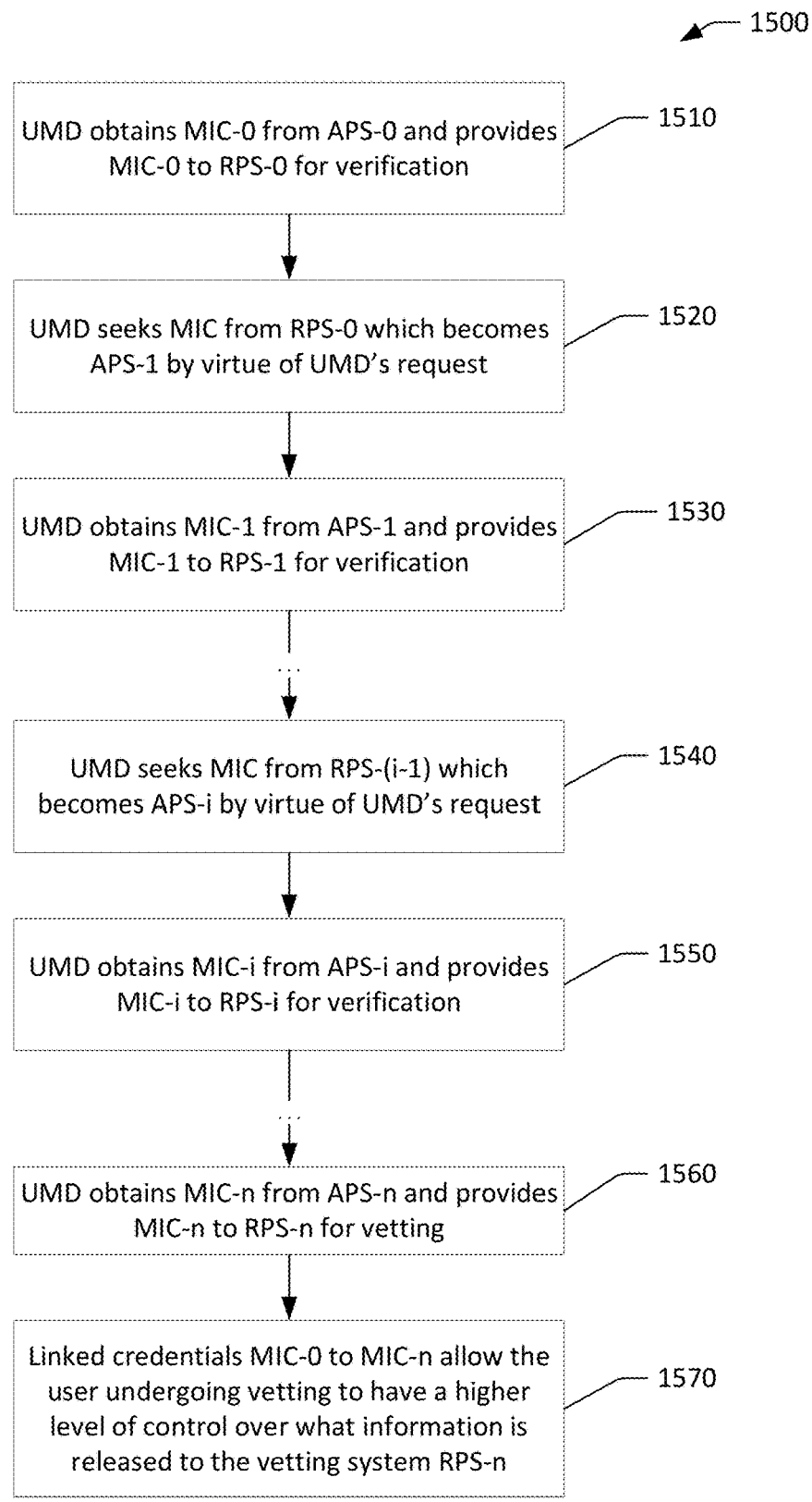
FIG. 15 is a flow diagram illustrating the creation of linked credentials.

FIG. 15 is a flow diagram 1500 illustrating the creation of linked credentials. In step 1510, the UMD obtains MIC-0 from APS-0 and provides MIC-0 to RPS-0 for verification. In step 1520, the UMD seeks MIC from RPS-0 which becomes APS-1 by virtue of UMD's request. APS-1 creates MIC-1 In step 1530, the UMD obtains MIC-1 from APS-1 and provides MIC-1 to RPS-1 for verification. In step 1540, the UMD seeks MIC from RPS-(i−1) which becomes APS-i by virtue of UMD's request. In step 1560, the UMD obtains MIC-n from APS-n and provides MIC-n to RPS-n for vetting. In step 1570, linked credentials MIC-0 to MIC-n allow the user undergoing vetting to have a higher level of control over what information is released to the vetting system RPS-n. The UMD achieves the higher level of control, for instance, by issuing a token/file that includes the consented data indication which indicates which of the user's linked MIC information (MIC-0 to MIC-n) is authorized for release.

Figure 16:
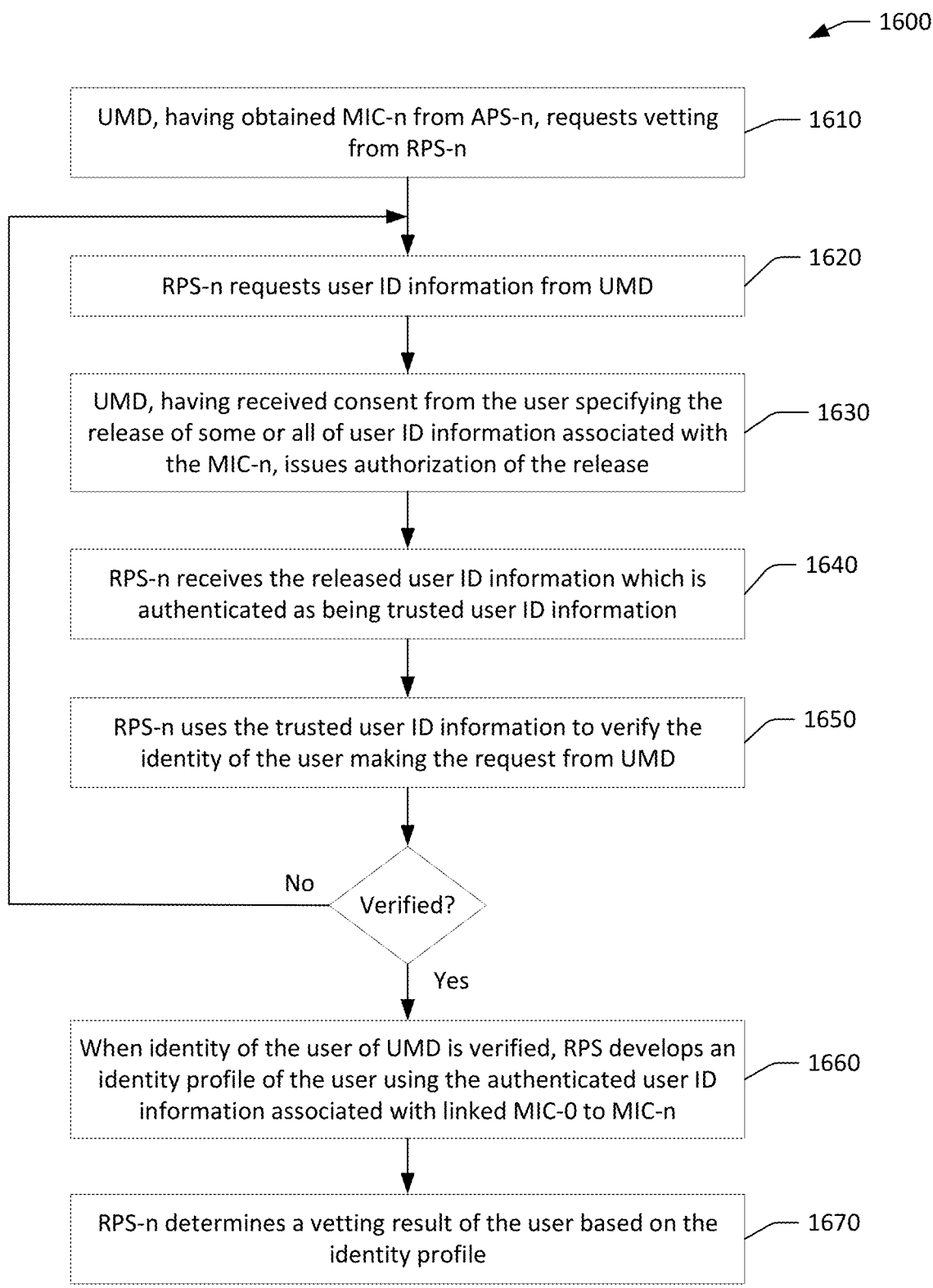
FIG. 16 is a flow diagram illustrating an embodiment of a process for a subject to submit a vetting request.

FIG. 16 is a flow diagram illustrating an embodiment of a process for a subject to submit a vetting request. In step 1610, the UMD (e.g., subject's device), having obtained a level-n mobile identification credential (MIC-n) from a level-n authorizing party system (APS-n) such as a bank, requests vetting of the subject from the RPS-n (e.g., vetting service) using a secure connection, for instance, via a secure network. The UMD may be a mobile device presented to the vetting service or may be some other device (stationary or mobile) from a remote location. One way to establish a secure connection may be by using session keys, as described above.

The MIC-n is linked to lower level mobile identification credentials from MIC-0 to MIC-(n−1). MIC-i (i=1 to n) is linked to MIC-(i−1) which the subject device received from APS-(i−1), and the APS-i is RPS-(i−1) which verified the identity of the subject using verified part or all of subject information associated with the MIC-(i−1), such that MIC-0 to MIC-n from level-0 to level-n are linked. The subject/user ID information associated with the MIC-n includes the subject information associated with MIC-0 to MIC-(n−1) by virtue of the linked status of MIC-0 to MIC-n.

In step 1620, the RPS-n requests subject/user ID information from the UMD in response to the request for vetting. The user may be notified of the request via a display or some other user interface on the UMD, and may give consent via a user interface of the UMD to release some or all of the user ID information associated with the MIC-n. Because the lower-level MIC-i (i=0 to n−1) are embedded or encapsulated in MIC-n, the user ID information released can originate from any level MIC-i (i=0 to n). In step 1630, the UMD issues authorization of the release, based on the user's consent, to the RPS-n or the APS-n in different embodiments. In some embodiments, the authorization may take the form of a token, an electronic document, a digital file, or the like issued from the UMD to the RPS-n and then submitted by the RPS-n to the APS-n seeking verification of the token, electronic document, digital file, or the like via the secure network. In some other embodiments, the authorization may be a direct request from the RPS-n to the APS-n or a token sent from the UMD to the APS-n to be matched with another token sent from the RPS-n to the APS-n.

In step 1640, the RPS-n receives the released user ID information which is verified as being trusted user ID information. In different embodiments, the APS-n may receive the authorization from the UMD (e.g., direct request in FIG. 10 or token in FIG. 11) or may examine the authorization from the RPS-n (e.g., electronic documents in FIGS. 8 and 9 or token in FIG. 11) for verification or nonverification. For user ID information originating at the MIC-n level, the APS-n provides the verification. For user ID information at the lower-level MIC-i (i=0 to n−1), the RPS-n has the choice of either (i) trusting the lower level RPS-i (i=0 to n−1) to have obtained the proper verification previously from APS-i at the lower levels, or (ii) seeking verification now from the lower level APS-i for user ID information originating at the MIC-i level (i=0 to (n−1)). When the authorization is verified, it establishes that the user ID information received by the RPS-n is valid and can be trusted. In some embodiments, the RPS-n may receive and use a public key or some other electronic document or digital file to verify that the user ID information received from the UMD is trustworthy.

Next, the vetting system, as a level-n relying party system (RPS-n), uses the trusted user ID information, which may be received from the UMD or the APS-n, to verify the identity of the user who requests the vetting using the UMD in step 1650. In some cases, the verification may involve matching the user's name and age. In other cases, more may be required to satisfy the RPS-n. For instance, the verification may involve matching other biographic and/or biometric information and/or additional information. What is required may depend on the nature or level of the vetting. For an in-person request for vetting, any biographic or biometric information can be obtained live from the person at the RPS-n using biometric devices or readers (e.g., fingerprint matching or recognition by a fingerprint reader, iris or retina matching or recognition by iris or retina scanner, facial matching or recognition by a facial imaging device, voice matching or recognition by a voice recording device, etc.). For online request for vetting, such information can be obtained from a trusted source and/or a liveness check can be required to obtain the biometric information. If the identity of the user is not verified, the RPS-n may request resubmission of the user ID information from the UMD.

In step 1660, when the identity of the user from the UMD is verified to the satisfaction of the RPS-n, the RPS-n develops an identity profile of the user using the verified user ID information associated with linked MIC-0 to MIC-n. In step 1670, the RPS-n determines a vetting result (e.g., pass or fail) of the user based on the identity profile.

Figure 17:
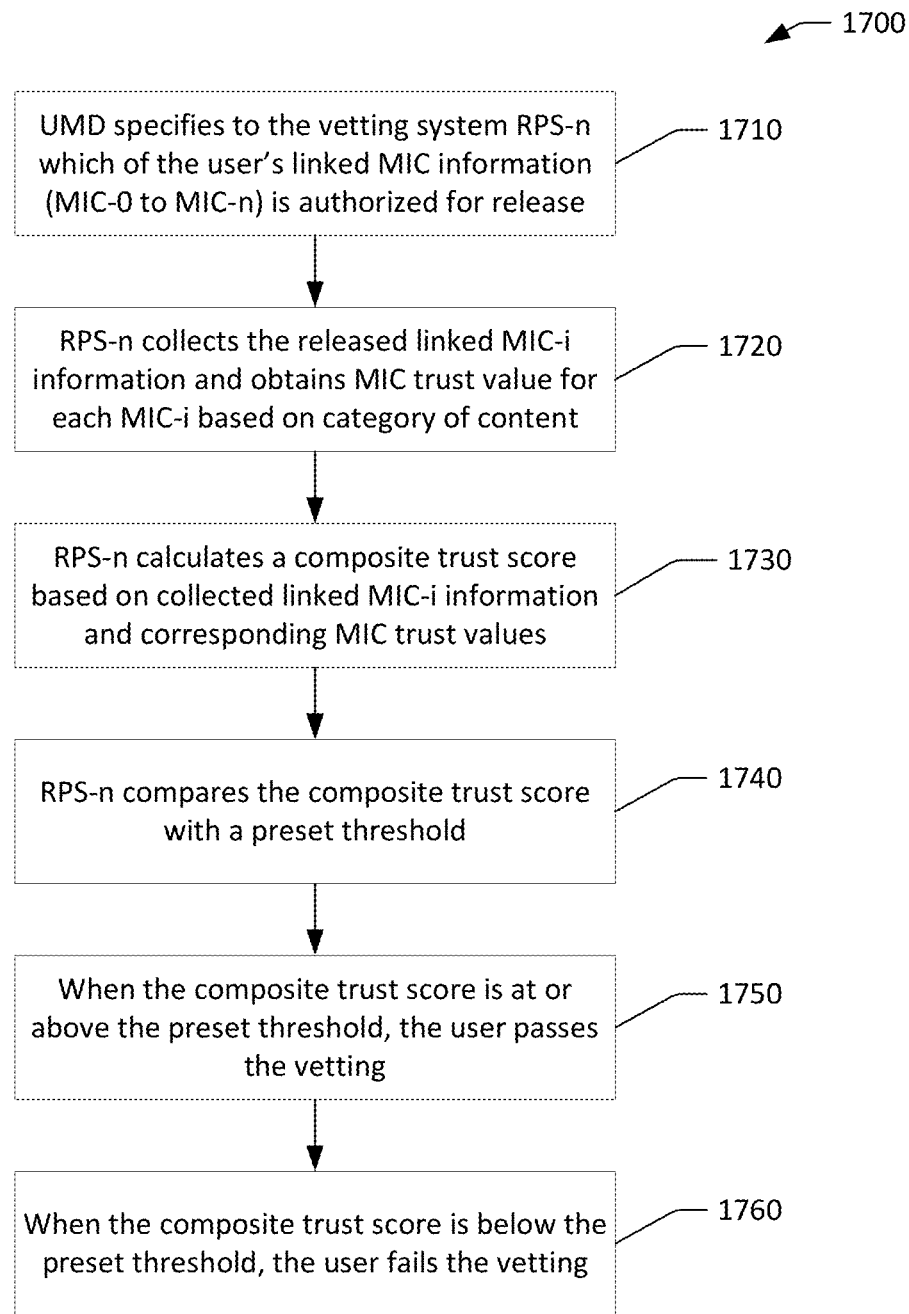
FIG. 17 is a flow diagram illustrating an embodiment of a process for vetting a subject using multiple confidence levels based on linked MICs.

FIG. 17 is a flow diagram 1700 illustrating an embodiment of a process for vetting a subject using multiple confidence levels based on linked MICs. The user applies for a job, a security clearance, a permit, credit approval, loan approval, or the like. The user consents to vetting or background check and becomes the subject of the vetting. The user has accumulated a set of linked credentials on the user's UMD (see FIGS. 14 and 15). The user consents via the UMD to the vetting by the vetting system RPS-n using the user's linked MIC information. In step 1710, the UMD, as directed by the user/subject, specifies to the vetting system RPS-n which of the user's linked MIC information (MIC-0 to MIC-n) is authorized for release. That is, it specifies which MIC information (MIC-i) is to be released and whether all or part of that MIC-i is to be released.

In step 1720, the vetting system RPS-n collects or compiles the released linked MIC-i information and obtains or assigns a MIC trust value for each MIC-i based on the category of content of the MIC information. For example, biometric information obtained at MIC-4 typically has a higher MIC trust value for establishing the subject's identity than occupation of the subject obtained at MIC-2. In specific embodiments, a trust value of 1.0 means a normal level of trust. A high trust value is greater than 1.0 and a low trust value is between 0.0 and 1.0. In step 1730, the RPS-n calculates a composite trust score based on the collection linked MIC-i information and the corresponding MIC trust values. In one example, the composite trust score is calculated by adding the MIC trust values and dividing the sum by the number of corresponding MIC levels to obtain an average MIC trust value as the composite trust score. In step 1740, the RPS-n compares the composite trust score with a preset threshold, which can be set by the vetting service or some other authorities or entities. When the composite trust score is at or above the preset threshold, the user passes the vetting (step 1750). When the composite trust score is below the preset threshold, the user fails the vetting (step 1760).

Figure 18:
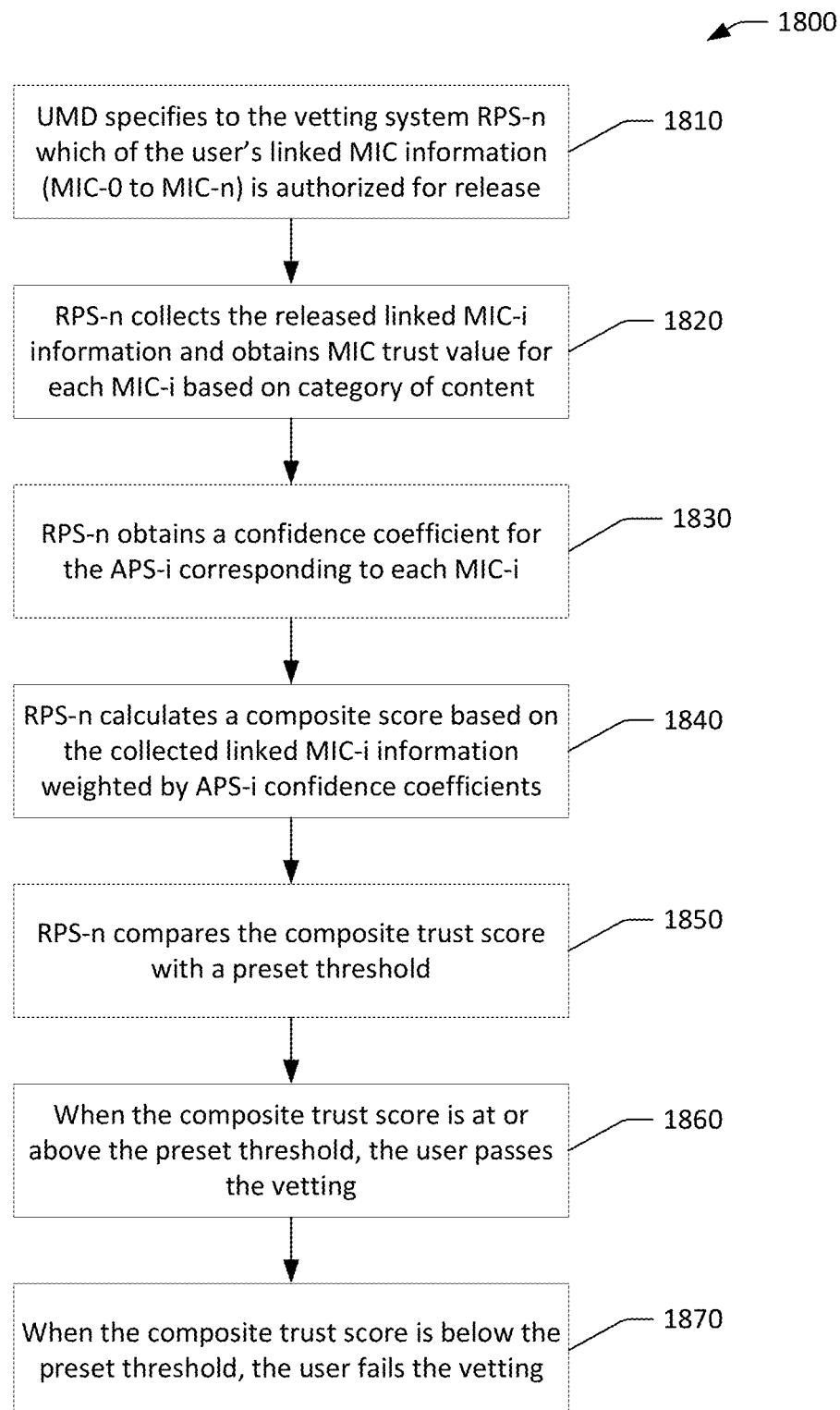
FIG. 18 is a flow diagram illustrating an embodiment of a process for vetting a subject using multiple confidence levels based on linked MICs weighted by confidence coefficients of corresponding APSs.

FIG. 18 is a flow diagram 1800 illustrating an embodiment of a process for vetting a subject using multiple confidence levels based on linked MICs weighted by confidence coefficients of corresponding APSs. Steps 1810 and 1820 are similar to steps 1710 and 1720. In step 1830, the RPS-n obtains or assigns a confidence coefficient for the APS-i corresponding to each MIC-i (i=1 to n). Various factors affect the confidence coefficients. For example, information received from a more trusted source such as a federal government source as opposed to a private source such as a small business has a higher confidence coefficient. In specific embodiments, a confidence coefficient of 1.0 means normal confidence level. A high confidence coefficient is greater than 1.0 and a low confidence coefficient is between 0.0 and 1.0. In step 1840, the RPS-n calculates a composite trust score based on the collection linked MIC-i information weighted by the APS-i confidence coefficients. For instance, the composite trust score is calculated by summing the MIC trust values each multiplied by the corresponding confidence coefficient and dividing the sum by the number of MICs to obtain an average value. In step 1850, the RPS-n compares the composite trust score with a preset threshold. When the composite trust score is at or above the preset threshold, the user passes the vetting (step 1860). When the composite trust score is below the preset threshold, the user fails the vetting (step 1870).

Figure 19:
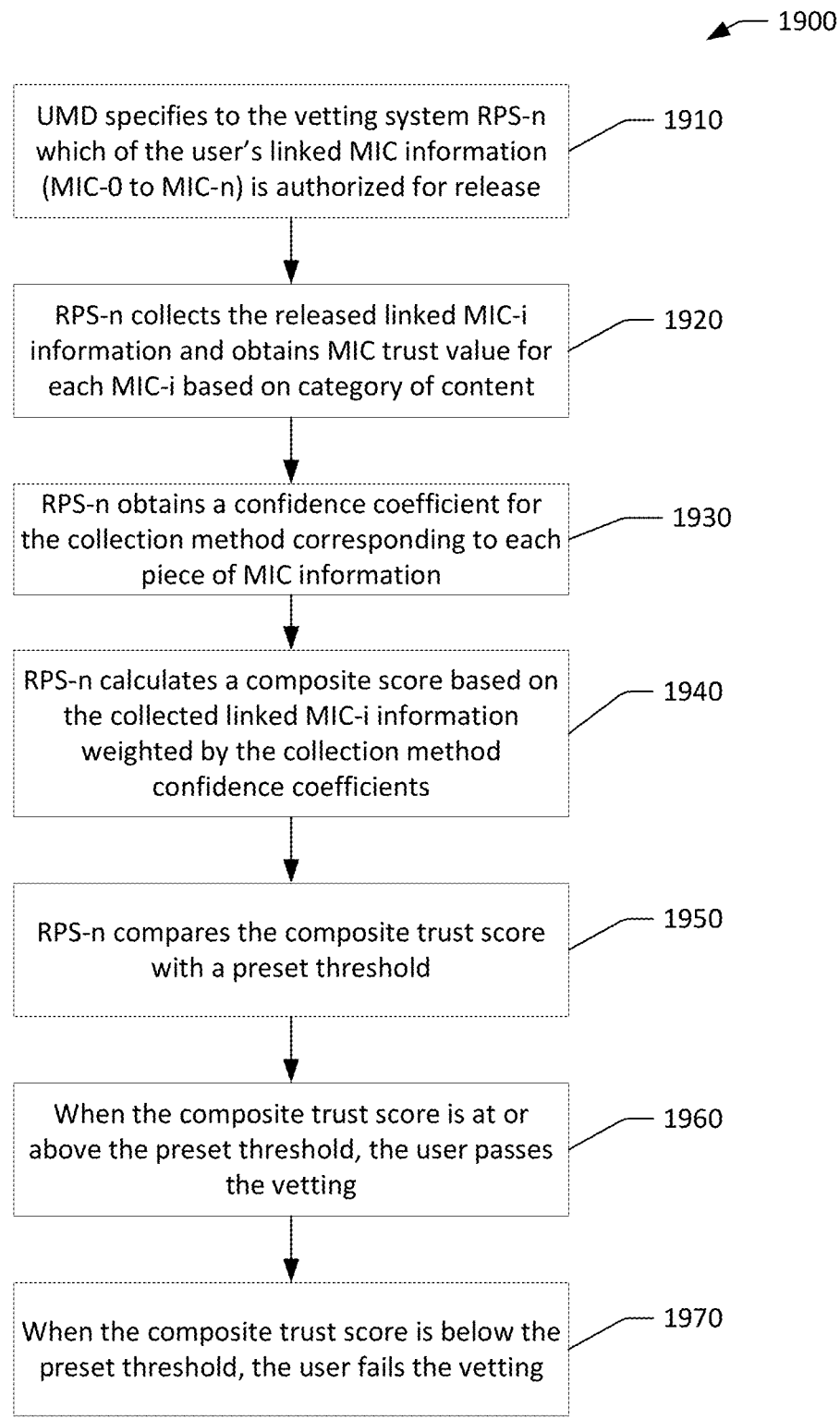
FIG. 19 is a flow diagram illustrating an embodiment of a process for vetting a subject using multiple confidence levels based on linked MICs weighted by confidence coefficients of collection methods corresponding to each piece of MIC information collected.

FIG. 19 is a flow diagram 1900 illustrating an embodiment of a process for vetting a subject using multiple confidence levels based on linked MICs weighted by confidence coefficients of collection methods corresponding to each piece of MIC information collected. Steps 1910 and 1920 are similar to steps 1710 and 1720. In step 1930, the RPS-n obtains or assigns a confidence coefficient for the collection method corresponding to each MIC information collected. Various factors affect the confidence coefficients. For example, information that is more difficult to obtain or manipulate/alter has a higher confidence coefficient. Certain types of digital footprint data such as location history and travel pattern stored in a mobile device are assigned relatively high confidence coefficients because it is difficult to tamper with or otherwise manipulate such data. Such data is more reliable in establishing residency than an address printed on an ID card which may be outdated or is more easily manipulated or altered. In step 1940, the RPS-n calculates a composite trust score based on the collection linked MIC-i information weighted by the collection method confidence coefficients. For instance, the composite trust score is calculated by summing the MIC trust values each multiplied by the corresponding confidence coefficient. In step 1950, the RPS-n compares the composite trust score with a preset threshold. When the composite trust score is at or above the preset threshold, the user passes the vetting (step 1960). When the composite trust score is below the preset threshold, the user fails the vetting (step 1970).

Figure 20:
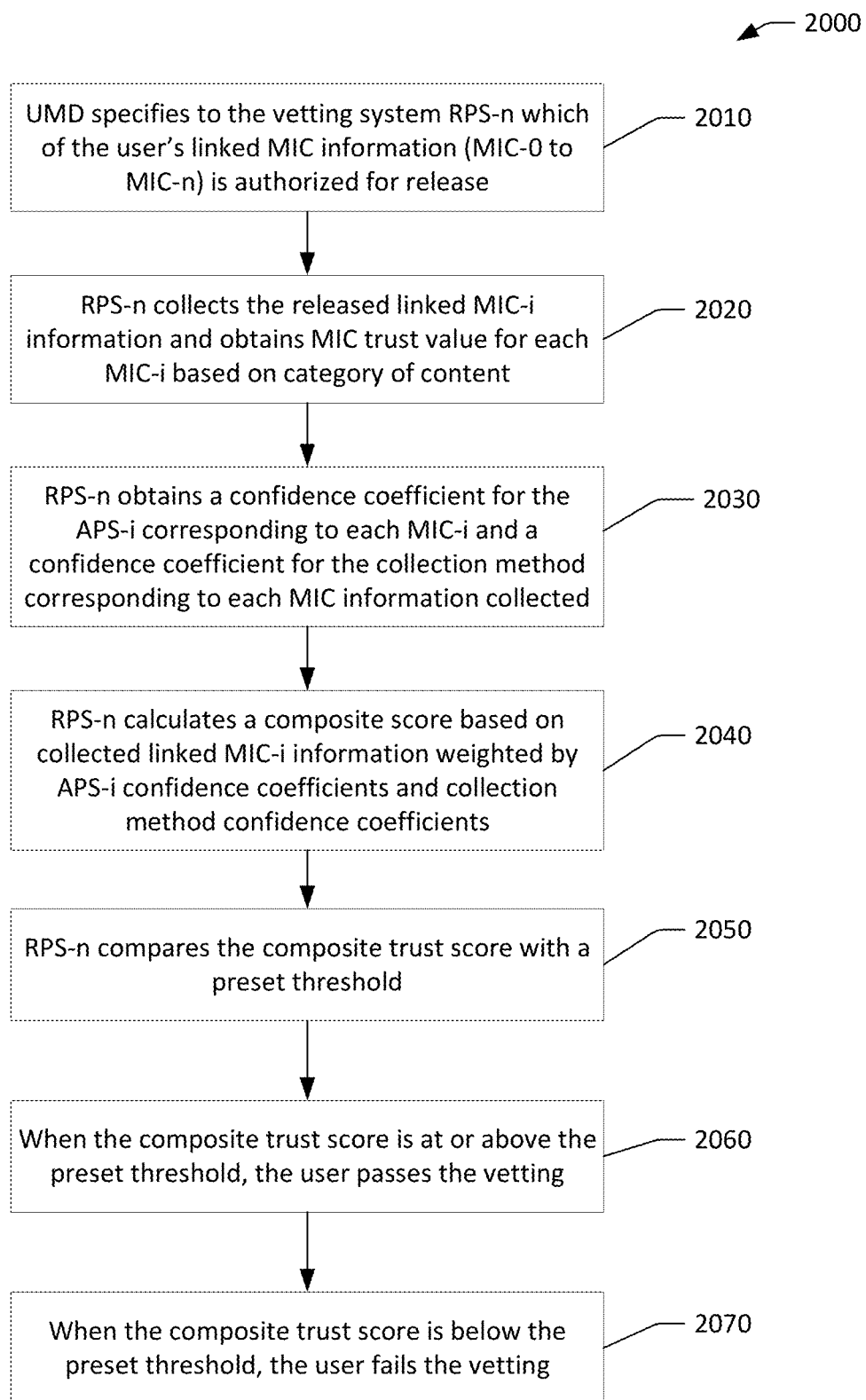
FIG. 20 is a flow diagram illustrating an embodiment of a process for vetting a subject using multiple confidence levels based on linked MICs weighted by the APS-i confidence coefficients and collection method confidence coefficients.

FIG. 20 is a flow diagram 2000 illustrating an embodiment of a process for vetting a subject using multiple confidence levels based on linked MICs weighted by the APS-i confidence coefficients and collection method confidence coefficients. Steps 2010 and 2020 are similar to steps 1710 and 1720. In step 2030, the RPS-n obtains a confidence coefficient for each APS-i corresponding to MIC-i (step 1830) and obtains a confidence coefficient for the collection method corresponding to each MIC information collected (step 1930). In step 2040, the RPS-n calculates a composite trust score based on the collected linked MIC-i information weighted by the APS-i confidence coefficients (step 1840) and the collection method confidence coefficients (step 1940). For instance, the composite trust score is calculated by summing the MIC trust values each multiplied by the corresponding APS-i and collection method confidence coefficients and dividing the sum by the number of MIC information to obtain an average. In step 2050, the RPS-n compares the composite trust score with a preset threshold. When the composite trust score is at or above the preset threshold, the user passes the vetting (step 2060). When the composite trust score is below the preset threshold, the user fails the vetting (step 2070).

The inventive concepts taught by way of the examples discussed above are amenable to modification, rearrangement, and embodiment in several ways. For example, this invention may be applicable for government purposes other than vetting for access to sensitive data, such as vetting for government employment or vetting to establish status when necessary to obtain a government benefit or service, including applications for immigration status. Furthermore, the methodology may be adapted for use by non-government entities for vetting a subject based on security, financial, ethics, moral, or other concerns.

Accordingly, although the present disclosure has been described with reference to specific embodiments and examples, persons skilled in the art will recognize that changes may be made in form and detail without departing from the spirit and scope of the disclosure.

Certain attributes, functions, steps of methods, or sub-steps of methods described herein may be associated with physical structures or components, such as a module of a physical device that, in implementations in accordance with this disclosure, make use of instructions (e.g., computer executable instructions) that are embodied in hardware, such as an application specific integrated circuit, computer-readable instructions that cause a computer (e.g., a general-purpose computer) executing the instructions to have defined characteristics, a combination of hardware and software such as processor implementing firmware, software, and so forth so as to function as a special purpose computer with the ascribed characteristics. For example, in embodiments a module may comprise a functional hardware unit (such as a self-contained hardware or software or a combination thereof) designed to interface the other components of a system such as through use of an API. In embodiments, a module is structured to perform a function or set of functions, such as in accordance with a described algorithm.

This disclosure may use nomenclature that associates a component or module with a function, purpose, step, or sub-step to identify the corresponding structure which, in instances, includes hardware and/or software that function for a specific purpose. For any computer-implemented embodiment, "means plus function" elements will use the term "means;" the terms "logic" and "module" and the like have the meaning ascribed to them above, if any, and are not to be construed as means.

The claims define the invention and form part of the specification. Limitations from the written description are not to be read into the claims.

An interpretation under 35 U.S.C. § 112(f) is desired only where this description and/or the claims use specific terminology historically recognized to invoke the benefit of interpretation, such as "means," and the structure corresponding to a recited function, to include the equivalents thereof, as permitted to the fullest extent of the law and this written description, may include the disclosure, the accompanying claims, and the drawings, as they would be understood by one of skill in the art.

To the extent the subject matter has been described in language specific to structural features and/or methodological steps, it is to be understood that the subject matter defined in the appended claims is not necessarily limited to the specific features or steps described. Rather, the specific features and steps are disclosed as example forms of implementing the claimed subject matter. To the extent headings are used, they are provided for the convenience of the reader and are not be taken as limiting or restricting the systems, techniques, approaches, methods, devices to those appearing in any section. Rather, the teachings and disclosures herein can be combined, rearranged, with other portions of this disclosure and the knowledge of one of ordinary skill in the art. It is the intention of this disclosure to encompass and include such variation. The indication of any elements or steps as "optional" does not indicate that all other or any other elements or steps are mandatory.

What is claimed is:

1. A method for vetting an individual as a subject to be vetted, the method comprising:
    receiving, by a vetting system of a vetting service, a vetting request from a subject device of the subject;
    sending, by the vetting system to the subject device, a request for identification information of the subject;
    receiving, by the vetting system, part or all of subject information associated with a level-n mobile identification credential (MIC-n) which the subject device received from a level-n authorizing party system (APS-n), the subject having consented to release the part or all of subject information to the vetting system, the part or all of subject information having been verified, the MIC-n being linked to lower level mobile identification credentials from MIC-0 to MIC-(n−1);
    using, by the vetting system as a level-n relying party system (RPS-n), the verified part or all of subject information associated with the linked MIC-0 to MIC-n to verify or not verify the identity of the subject;
    developing an identity profile of the subject, by the vetting system, based on verifying or not verifying the identity of the subject using the verified part or all of subject information associated with the linked MIC-0 to MIC-n; and
    determining a vetting result of the subject, by the vetting system, based on the identity profile;
    MIC-i (i=1 to n) being linked to MIC-(i−1) which the subject device received from APS-(i−1), and the APS-i being RPS-(i−1) which verified the identity of the subject using verified part or all of subject information associated with the MIC-(i−1), with MIC-0 to MIC-n from level-0 to level-n being linked; and
    the subject information associated with the MIC-n including the subject information associated with MIC-0 to MIC-(n−1) by virtue of a linked status of MIC-0 to MIC-n;
    wherein receiving the verified part or all of subject information comprises:
    receiving, by the vetting system from the subject device, a token specifying the part or all of subject information which the subject has consented to release to the vetting system;
    sending, by the vetting system to the APS-n, the received token, which is to be verified by the APS-n with another token sent from the subject device to the APS-n;
    when the tokens are received by the APS-n within a preset timeframe and are verified by the APS-n, receiving, by the vetting system from the APS-n, the verified part or all of subject information; and
    when the tokens are not received by the APS-n within the preset timeframe or are not verified by the APS-n, receiving, by the vetting system from the APS-n, a notification to resubmit the request for identification information of the subject.

2. The method of claim 1, further comprising:
    sending, by the vetting system to the subject device, a request for a liveness check;
    receiving, (i) by the vetting system, from the subject, liveness check information and evaluating the liveness check information to determine whether the liveness check is valid or invalid, or (ii) by the vetting system, from the APS-n which has evaluated liveness check information received from the subject, a determination by the APS-n as to whether the liveness check is valid or invalid;
    developing the identity profile of the subject, by the vetting system, based on verifying or not verifying the identity of the subject using the verified part or all of subject information associated with the linked MIC-0 to MIC-n, when the liveness check is valid; and
    denying the vetting request from the subject when the liveness check is invalid.

3. The method of claim 1, wherein determining the vetting result comprises:
    obtaining, by the vetting system, a MIC trust value for each level of MIC from MIC-0 to MIC-n, wherein a higher MIC trust value indicates a higher trust in a category of content of the MIC having the higher MIC trust value;
    calculating, by the vetting system, a composite trust score based on the MIC trust value for each level of MIC; and
    comparing, by the vetting system, the calculated composite trust score with a preset threshold;
    wherein the subject passes the vetting when the calculated composite trust score is at or above the preset threshold and the subject fails the vetting when the calculated composite trust score is below the preset threshold.

4. The method of claim 1, wherein determining the vetting result comprises:
    obtaining, by the vetting system, a MIC trust value for each level of MIC from MIC-0 to MIC-n, wherein a higher MIC trust value indicates a higher trust in a category of content of the MIC having the higher MIC trust value;

obtaining, by the vetting system, an APS confidence coefficient for each level of APS from APS-0 to APS-n, wherein a higher APS confidence coefficient indicates a higher confidence in the authorizing party associated with the higher APS confidence coefficient;

calculating, by the vetting system, a composite trust score based on the MIC trust value for each level of MIC, weighted by a corresponding APS confidence coefficient at a corresponding level of APS, for the part of all subject information associated with the linked MIC-0 to MIC-n; and comparing, by the vetting system, the calculated composite trust score with a preset threshold;

wherein the subject passes the vetting when the calculated composite trust score is at or above the preset threshold and the subject fails the vetting when the calculated composite trust score is below the preset threshold.

5. The method of claim 1, wherein determining the vetting result comprises:

obtaining, by the vetting system, a MIC trust value for each level of MIC from MIC-0 to MIC-n, wherein a higher MIC trust value indicates a higher trust in a category of content of the MIC having the higher MIC trust value;

obtaining, by the vetting system, a collection method confidence coefficient for each method of collecting a corresponding part of the subject information, wherein a higher collection method confidence coefficient indicates a higher confidence in the collection method associated with the higher collection method confidence coefficient;

calculating, by the vetting system, a composite trust score based on the MIC trust value for each level of MIC, weighted by a corresponding collection method confidence coefficient for the corresponding part, for the part of all subject information associated with the linked MIC-0 to MIC-n; and comparing, by the vetting system, the calculated composite trust score with a preset threshold;

wherein the subject passes the vetting when the calculated composite trust score is at or above the preset threshold and the subject fails the vetting when the calculated composite trust score is below the preset threshold.

6. The method of claim 1, wherein determining the vetting result comprises:

obtaining, by the vetting system, a MIC trust value for each level of MIC from MIC-0 to MIC-n, wherein a higher MIC trust value indicates a higher trust in a content of the MIC having the higher MIC trust value;

obtaining, by the vetting system, an APS confidence coefficient for each level of APS from APS-0 to APS-n, wherein a higher APS confidence coefficient indicates a higher confidence in the authorizing party associated with the higher APS confidence coefficient;

obtaining, by the vetting system, a collection method confidence coefficient for each method of collecting a corresponding part of the subject information, wherein a higher collection method confidence coefficient indicates a higher confidence in the collection method associated with the higher collection method confidence coefficient;

calculating, by the vetting system, a composite trust score based on the MIC trust value for each level of MIC, weighted by a corresponding APS confidence coefficient at a corresponding level of APS and weighted by a corresponding collection method confidence coefficient for the corresponding part, for the part of all subject information associated with the linked MIC-0 to MIC-n; and comparing, by the vetting system, the calculated composite trust score with a preset threshold;

wherein the subject passes the vetting when the calculated composite trust score is at or above the preset threshold and the subject fails the vetting when the calculated composite trust score is below the preset threshold.

7. A vetting system for a vetting service to vet an individual as a subject to be vetted, the vetting system comprising a computer programmed to:

receive a vetting request from a subject device of the subject;

send, to the subject device, a request for identification information of the subject;

receive part or all of subject information associated with a level-n mobile identification credential (MIC-n) which the subject device received from a level-n authorizing party system (APS-n), the subject having consented to release the part or all of subject information to the vetting system, the part or all of subject information having been, the MIC-n being linked to lower level mobile identification credentials from MIC-0 to MIC-(n−1);

use, by the vetting system as a level-n relying party system (RPS-n), the verified part or all of subject information associated with the linked MIC-0 to MIC-n to verify or not verify the identity of the subject;

develop an identity profile of the subject based on verifying or not verifying the identity of the subject using the verified part or all of subject information associated with the linked MIC-0 to MIC-n; and determine a vetting result of the subject based on the identity profile;

MIC-i (i=1 to n) being linked to MIC-(i−1) which the subject device received from APS-(i−1), and the APS-i being RPS-(i−1) which verified the identity of the subject using verified part or all of subject information associated with the MIC-(i−1), with MIC-0 to MIC-n from level-0 to level-n being linked; and the subject information associated with the MIC-n including the subject information associated with MIC-0 to MIC-(n−1) by virtue of a linked status of MIC-0 to MIC-n;

wherein receiving the verified part or all of subject information comprises:

receiving, by the vetting system from the subject device, a token specifying the part or all of subject information which the subject has consented to release to the vetting system;

sending, by the vetting system to the APS-n, the received token, which is to be verified by the APS-n with another token sent from the subject device to the APS-n;

when the tokens are received by the APS-n within a preset timeframe and are verified by the APS-n, receiving, by the vetting system from the APS-n, the verified part or all of subject information; and when the tokens are not received by the APS-n within the preset timeframe or are not verified by the APS-n, receiving, by the vetting system from the APS-n, a notification to resubmit the request for identification information of the subject.

8. The vetting system of claim 7, wherein the computer is further programmed to:
send, to the subject device, a request for a liveness check;
receive, (i) from the subject, liveness check information and evaluate the liveness check information to determine whether the liveness check is valid or invalid, or (ii) from the APS-n which has evaluated liveness check information received from the subject, a determination by the APS-n as to whether the liveness check is valid or invalid;
develop the identity profile of the subject, based on verifying or not verifying the identity of the subject using the verified part or all of subject information associated with the linked MIC-0 to MIC-n, when the liveness check is valid; and
deny the vetting request from the subject when the liveness check is invalid.

9. The vetting system of claim 7, wherein determining the vetting result comprises:
obtaining a MIC trust value for each level of MIC from MIC-0 to MIC-n, wherein a higher MIC trust value indicates a higher trust in a category of content of the MIC having the higher MIC trust value;
calculating a composite trust score based on the MIC trust value for each level of MIC; and
comparing the calculated composite trust score with a preset threshold;
wherein the subject passes the vetting when the calculated composite trust score is at or above the preset threshold and the subject fails the vetting when the calculated composite trust score is below the preset threshold.

10. The vetting system of claim 7, wherein determining the vetting result comprises:
obtaining, by the vetting system, a MIC trust value for each level of MIC from MIC-0 to MIC-n, wherein a higher MIC trust value indicates a higher trust in a category of content of the MIC having the higher MIC trust value;
obtaining, by the vetting system, an APS confidence coefficient for each level of APS from APS-0 to APS-n, wherein a higher APS confidence coefficient indicates a higher confidence in the authorizing party associated with the higher APS confidence coefficient;
calculating, by the vetting system, a composite trust score based on the MIC trust value for each level of MIC, weighted by a corresponding APS confidence coefficient at a corresponding level of APS, for the part of all subject information associated with the linked MIC-0 to MIC-n; and
comparing, by the vetting system, the calculated composite trust score with a preset threshold;
wherein the subject passes the vetting when the calculated composite trust score is at or above the preset threshold and the subject fails the vetting when the calculated composite trust score is below the preset threshold.

11. The vetting system of claim 7, wherein determining the vetting result comprises:
obtaining, by the vetting system, a MIC trust value for each level of MIC from MIC-0 to MIC-n, wherein a higher MIC trust value indicates a higher trust in a category of content of the MIC having the higher MIC trust value;
obtaining, by the vetting system, a collection method confidence coefficient for each method of collecting a corresponding part of the subject information, wherein a higher collection method confidence coefficient indicates a higher confidence in the collection method associated with the higher collection method confidence coefficient; and
calculating, by the vetting system, a composite trust score based on the MIC trust value for each level of MIC, weighted by a corresponding collection method confidence coefficient for the corresponding part, for the part of all subject information associated with the linked MIC-0 to MIC-n; and
comparing, by the vetting system, the calculated composite trust score with a preset threshold;
wherein the subject passes the vetting when the calculated composite trust score is at or above the preset threshold and the subject fails the vetting when the calculated composite trust score is below the preset threshold.

12. The vetting system of claim 7, wherein determining the vetting result comprises:
obtaining, by the vetting system, a MIC trust value for each level of MIC from MIC-0 to MIC-n, wherein a higher MIC trust value indicates a higher trust in a content of the MIC having the higher MIC trust value;
obtaining, by the vetting system, an APS confidence coefficient for each level of APS from APS-0 to APS-n, wherein a higher APS confidence coefficient indicates a higher confidence in the authorizing party associated with the higher APS confidence coefficient;
obtaining, by the vetting system, a collection method confidence coefficient for each method of collecting a corresponding part of the subject information, wherein a higher collection method confidence coefficient indicates a higher confidence in the collection method associated with the higher collection method confidence coefficient;
calculating, by the vetting system, a composite trust score based on the MIC trust value for each level of MIC, weighted by a corresponding APS confidence coefficient at a corresponding level of APS and weighted by a corresponding collection method confidence coefficient for the corresponding part, for the part of all subject information associated with the linked MIC-0 to MIC-n; and
comparing, by the vetting system, the calculated composite trust score with a preset threshold;
wherein the subject passes the vetting when the calculated composite trust score is at or above the preset threshold and the subject fails the vetting when the calculated composite trust score is below the preset threshold.

13. A system, comprising a subject device and a vetting system of a vetting service, for a subject using the subject device to submit a vetting request to the vetting system of the vetting service, the vetting system including a vetting service computer programmed to perform operations according to vetting service instructions, the subject device including a subject computer programmed to perform operations according to subject instructions, the subject device having received a level-n mobile identification credential (MIC-n) from a level-n authorizing party system (APS-n), the APS-n including an APS-n computer programmed to perform operations according to APS-n instructions, the MIC-n being linked to lower level mobile identification credentials from MIC-0 to MIC-(n−1),
the subject device sending, to the vetting system, a vetting request to vet the subject;
the vetting system sending, to the subject device, a request for identification information of the subject;

the subject device receiving, from the subject, consent to release part or all of subject information associated with the MIC-n;
(i) the subject device sending, to the vetting system, the consented part or all of subject information, and the APS-n verifying the part or all of subject information associated with the MIC-n or (ii) the APS-n sending, to the vetting system, the consented part or all of subject information as verified part or all of subject information associated with the MIC-n;
the vetting system, as a level-n relying party system (RPS-n) using the verified part or all of subject information associated with the MIC-n to verify or not verify the identity of the subject; and
the vetting system developing an identity profile of the subject based on verifying or not verifying the identity of the subject using the verified part or all of subject information associated with the linked MIC-0 to MIC-n;
the vetting system determining a vetting result of the subject based on the identity profile;
MIC-i (i=1 to n) being linked to MIC-(i−1) which the subject device received from APS-(i−1), and the APS-i being RPS-(i−1) which verified the identity of the subject using verified part or all of subject information associated with the MIC-(i−1), with MIC-0 to MIC-n from level-0 to level-n being linked; and
the subject information associated with the MIC-n including the subject information associated with MIC-0 to MIC-(n−1) by virtue of a linked status of MIC-0 to MIC-n;
wherein:
the subject device sends, to the vetting system, a token specifying the part or all of subject information which the subject has consented to release to the vetting system;
the vetting system sends, to the APS-n, the received token;
the subject device sends another token to the APS-n;
when the tokens are received by the APS-n within a preset timeframe and are verified by the APS-n, the vetting system receives the verified part or all of subject information; and
when the tokens are not received by the APS-n within the preset timeframe or are not verified by the APS-n, the APS-n sends, to the vetting system, a notification to resubmit the request for identification information of the subject.

14. The system of claim 13, wherein:
the vetting system sends, to the subject device, a request for a liveness check;
the vetting system receives, (i) from the subject, liveness check information and evaluates the liveness check information to determine whether the liveness check is valid or invalid, or (ii) from the APS-n which has evaluated liveness check information received from the subject, a determination by the APS-n as to whether the liveness check is valid or invalid;
the vetting system develops the identity profile of the subject, based on verifying or not verifying the identity of the subject using the verified part or all of subject information associated with the linked MIC-0 to MIC-n, when the liveness check is valid; and
the vetting system denies the vetting request from the subject when the liveness check is invalid.

15. The system of claim 13, wherein:
the vetting system obtains a MIC trust value for each level of MIC from MIC-0 to MIC-n, wherein a higher MIC trust value indicates a higher trust in a category of content of the MIC having the higher MIC trust value;
the vetting system calculates a composite trust score based on the MIC trust value for each level of MIC;
the vetting system compares the calculated composite trust score with a preset threshold; and
the subject passes the vetting when the calculated composite trust score is at or above the preset threshold and the subject fails the vetting when the calculated composite trust score is below the preset threshold.

16. The system of claim 13, wherein:
the vetting system obtains a MIC trust value for each level of MIC from MIC-0 to MIC-n, wherein a higher MIC trust value indicates a higher trust in a category of content of the MIC having the higher MIC trust value;
the vetting system obtains an APS confidence coefficient for each level of APS from APS-0 to APS-n, wherein a higher APS confidence coefficient indicates a higher confidence in the authorizing party associated with the higher APS confidence coefficient;
the vetting system calculates a composite trust score based on the MIC trust value for each level of MIC, weighted by a corresponding APS confidence coefficient at a corresponding level of APS, for the part of all subject information associated with the linked MIC-0 to MIC-n;
the vetting system compares the calculated composite trust score with a preset threshold; and
the subject passes the vetting when the calculated composite trust score is at or above the preset threshold and the subject fails the vetting when the calculated composite trust score is below the preset threshold.

17. The system of claim 13, wherein:
the vetting system obtains a MIC trust value for each level of MIC from MIC-0 to MIC-n, wherein a higher MIC trust value indicates a higher trust in a category of content of the MIC having the higher MIC trust value;
the vetting system obtains a collection method confidence coefficient for each method of collecting a corresponding part of the subject information, wherein a higher collection method confidence coefficient indicates a higher confidence in the collection method associated with the higher collection method confidence coefficient;
the vetting system calculates a composite trust score based on the MIC trust value for each level of MIC, weighted by a corresponding collection method confidence coefficient for the corresponding part, for the part of all subject information associated with the linked MIC-0 to MIC-n;
the vetting system compares the calculated composite trust score with a preset threshold; and
the subject passes the vetting when the calculated composite trust score is at or above the preset threshold and the subject fails the vetting when the calculated composite trust score is below the preset threshold.

18. The system of claim 13, wherein:
the vetting system obtains a MIC trust value for each level of MIC from MIC-0 to MIC-n, wherein a higher MIC trust value indicates a higher trust in a content of the MIC having the higher MIC trust value;
the vetting system obtains an APS confidence coefficient for each level of APS from APS-0 to APS-n, wherein a higher APS confidence coefficient indicates a higher confidence in the authorizing party associated with the higher APS confidence coefficient;

the vetting system obtains a collection method confidence coefficient for each method of collecting a corresponding part of the subject information, wherein a higher collection method confidence coefficient indicates a higher confidence in the collection method associated with the higher collection method confidence coefficient;

the vetting system calculates a composite trust score based on the MIC trust value for each level of MIC, weighted by a corresponding APS confidence coefficient at a corresponding level of APS and weighted by a corresponding collection method confidence coefficient for the corresponding part, for the part of all subject information associated with the linked MIC-0 to MIC-n;

the vetting system compares the calculated composite trust score with a preset threshold; and the subject passes the vetting when the calculated composite trust score is at or above the preset threshold and the subject fails the vetting when the calculated composite trust score is below the preset threshold.

* * * * *